US012131644B2

(12) United States Patent
Zhang et al.

(10) Patent No.: US 12,131,644 B2
(45) Date of Patent: Oct. 29, 2024

(54) TRAFFIC CONTROL DEVICE

(71) Applicant: Mitsubishi Electric Corporation, Tokyo (JP)

(72) Inventors: Haiyue Zhang, Tokyo (JP); Takahisa Aoyagi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 189 days.

(21) Appl. No.: 17/973,330

(22) Filed: Oct. 25, 2022

(65) Prior Publication Data

US 2023/0177962 A1 Jun. 8, 2023

(30) Foreign Application Priority Data

Dec. 6, 2021 (JP) ................................ 2021-197467

(51) Int. Cl.
*G08G 1/16* (2006.01)
*G08G 1/052* (2006.01)

(52) U.S. Cl.
CPC ............ *G08G 1/164* (2013.01); *G08G 1/052* (2013.01)

(58) Field of Classification Search
CPC .... G08G 1/0112; G08G 1/052; G08G 1/0116; G08G 1/0145; G08G 1/04
See application file for complete search history.

(56) References Cited

U.S. PATENT DOCUMENTS 10,810,880 B1 * 10/2020 Schweitzer .......... G08G 1/0133
11,348,455 B2 * 5/2022 Gu .................. G08G 1/096783
2014/0365104 A1 * 12/2014 Sasaki ............ B60W 30/18154 701/119
2017/0154531 A1 * 6/2017 Funabashi ............ G08G 1/166
2019/0206236 A1 * 7/2019 Tao ........................ G08G 1/08
2020/0193813 A1 * 6/2020 Sui ........................ G08G 1/166
2021/0142676 A1 * 5/2021 Schweitzer .......... G08G 1/0133
2021/0225162 A1 * 7/2021 Tao ...................... G08G 1/0145
2021/0245755 A1 * 8/2021 Bai ...................... H04W 4/023

FOREIGN PATENT DOCUMENTS

JP 2017-27175 A 2/2017
JP 2017-117328 A 6/2017
JP 2019-172068 A 10/2019

OTHER PUBLICATIONS

Office Action dated Nov. 1, 2022 issued by the Japanese Patent Office in Japanese Application No. 2021-197467.

* cited by examiner

*Primary Examiner* — Sisay Yacob
(74) *Attorney, Agent, or Firm* — Sughrue Mion, PLLC; Richard C. Turner

(57) ABSTRACT

A traffic control device includes: a passage schedule calculation unit which calculates, on the basis of vehicle information about vehicles that enter an intersection, passage schedules according to which the vehicles pass through the intersection; a collision determination unit which determines, on the basis of the passage schedules, whether the vehicles have a possibility of a collision; a passage rank setting unit which sets passage ranks for the vehicles if there is the possibility of the collision; and a passage schedule adjustment unit which calculates an adjustment period on the basis of a result of comparing the passage schedules for the vehicles determined to have the possibility of the collision, and delays, by the adjustment period, a passage schedule for a vehicle that has a low passage rank among the vehicles determined to have the possibility of the collision, to adjust the passage schedule.

18 Claims, 31 Drawing Sheets

FIG. 11D

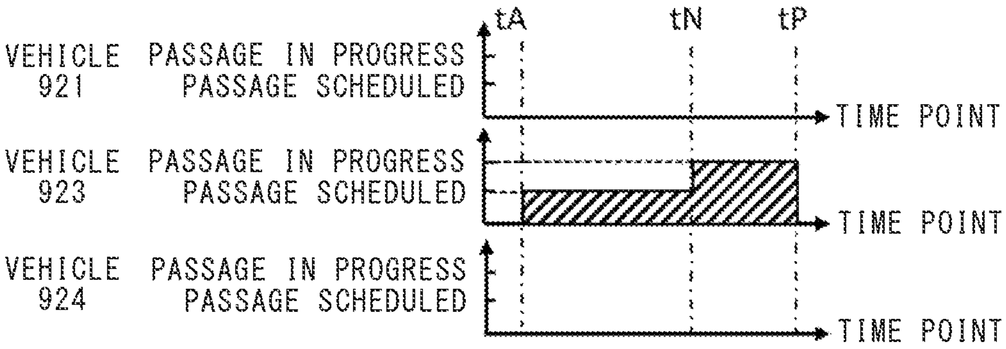

FIG. 12

| AT SAME TIME POINT IN SAME AREA | "PASSAGE IN PROGRESS" & "PASSAGE IN PROGRESS" | "PASSAGE IN PROGRESS" & "PASSAGE SCHEDULED" | "PASSAGE SCHEDULED" & "PASSAGE SCHEDULED" |
|---|---|---|---|
| POSSIBILITY OF COLLISION | × | ○ | × |

○: THERE IS NO POSSIBILITY OF COLLISION.
×: THERE IS POSSIBILITY OF COLLISION

FIG. 13

| PRIORITY LEVEL | CONDITION |
|---|---|
| 1 | VEHICLE HAVING ALREADY ENTERED UNADJUSTABLE AREA NR |
| 2 | VEHICLE HAVING ALREADY WAITED FOR AT LEAST PREDETERMINED PERIOD |
| 3 | VEHICLE FOLLOWED BY AT LEAST PREDETERMINED NUMBER OF SUBSEQUENT VEHICLES |
| 4 | VEHICLE STRAIGHTLY ADVANCING |
| 5 | VEHICLE TURNING LEFT |
| 6 | VEHICLE TURNING RIGHT |
| 7 | VEHICLE FOLLOWED BY MORE SUBSEQUENT VEHICLES |
| 8 | DEFAULT PRIORITY LEVEL IN INTERSECTION |

TRAFFIC CONTROL DEVICE

BACKGROUND OF THE INVENTION

1. Field of the Invention

The present disclosure relates to a traffic control device.

2. Description of the Background Art

A traffic control device manages traveling states of respective vehicles in a vehicle travel system and performs necessary adjustment if, for example, there is a possibility of a collision. In an intersection, information about the locations and the speeds of vehicles, people, obstacles, and the like within the intersection and near the intersection is acquired, and a driving command or a waiting command is transmitted to each vehicle on the basis of the acquired information such that the vehicles and the like do not collide.

The traffic control device needs to allow vehicles to pass through the intersection as smoothly as possible while preventing the vehicles from colliding. Patent Document 1 proposes determining, when a vehicle approaches a T junction, an operation for avoiding a collision of the vehicle with an obstacle on the basis of a result of detecting the advancing direction of the obstacle. Regarding the technology of Patent Document 1, it is described that a possibility of a collision is determined from the relationship between the advancing direction of the own vehicle and the advancing direction of another vehicle in a T junction, and the vehicles are caused to pass through the T junction according to a predetermined passage sequence so that an avoidance operation is performed.

Patent Document 1: Japanese Laid-Open Patent Publication No. 2019-172068 (paragraphs [0053]-[0058] of the description, and FIG. 3 and FIG. 4)

However, the technology described in Patent Document 1 merely involves determining a passage sequence for the vehicles on the basis of the advancing directions thereof (directions of straight advancement, left turn, or right turn) and does not present any specific manner of setting intersection-passage time points of the vehicles. Consequently, a waiting period that is longer than necessary might result, and the smoothness of traffic in the intersection might be impaired.

SUMMARY OF THE INVENTION

The present disclosure has been made to solve the above drawback, and an object of the present disclosure is to provide a traffic control device that realizes smooth traffic in an intersection.

A traffic control device according to the present disclosure includes: an area setting unit configured to set one or a plurality of areas in an intersection; a vehicle information collection unit configured to collect, regarding each of a plurality of vehicles that enter the intersection, vehicle information including a location of the vehicle, a vehicle speed of the vehicle, and a passage direction of the vehicle in the intersection; a passage schedule calculation unit configured to calculate passage schedules on the basis of the vehicle information, each passage schedule indicating a time period during which the area is kept as a passage-scheduled area for the vehicle when the vehicle passes through the intersection, and a time period during which the area is kept as a passage-in-progress area for the vehicle when the vehicle passes through the intersection; a collision determination unit configured to determine, on the basis of the passage schedules, whether or not the vehicles have a possibility of a collision; a passage rank setting unit configured to, if the collision determination unit determines that the vehicles have the possibility of the collision, set passage ranks for the vehicles having the possibility of undergoing the collision, the passage rank setting unit performing the setting on the basis of predetermined priority levels; a command generation unit configured to generate a command for each vehicle; a command transmission unit configured to transmit the command to the vehicle; and a passage schedule adjustment unit configured to, if the collision determination unit determines that the vehicles have the possibility of the collision, calculate an adjustment period on the basis of a result of comparing the passage schedules for the vehicles determined to have the possibility of the collision, the passage schedule adjustment unit delaying, by the adjustment period, a passage schedule for a vehicle that has a low passage rank among the vehicles determined to have the possibility of the collision, to adjust the passage schedule.

The traffic control device according to the present disclosure can realize smooth traffic in an intersection.

BRIEF DESCRIPTION OF THE DRAWINGS

FIG. 11D is a diagram for comparison between passage schedules for the respective vehicles, and is a diagram for comparison between passage schedules for the respective vehicles in an area D;

FIG. 12 is a diagram showing an example of collision determination criteria in the first embodiment;

FIG. 13 is a diagram showing an example of priority levels in the first embodiment;

DETAILED DESCRIPTION OF THE PREFERRED EMBODIMENTS OF THE INVENTION

First Embodiment

Figure 1:
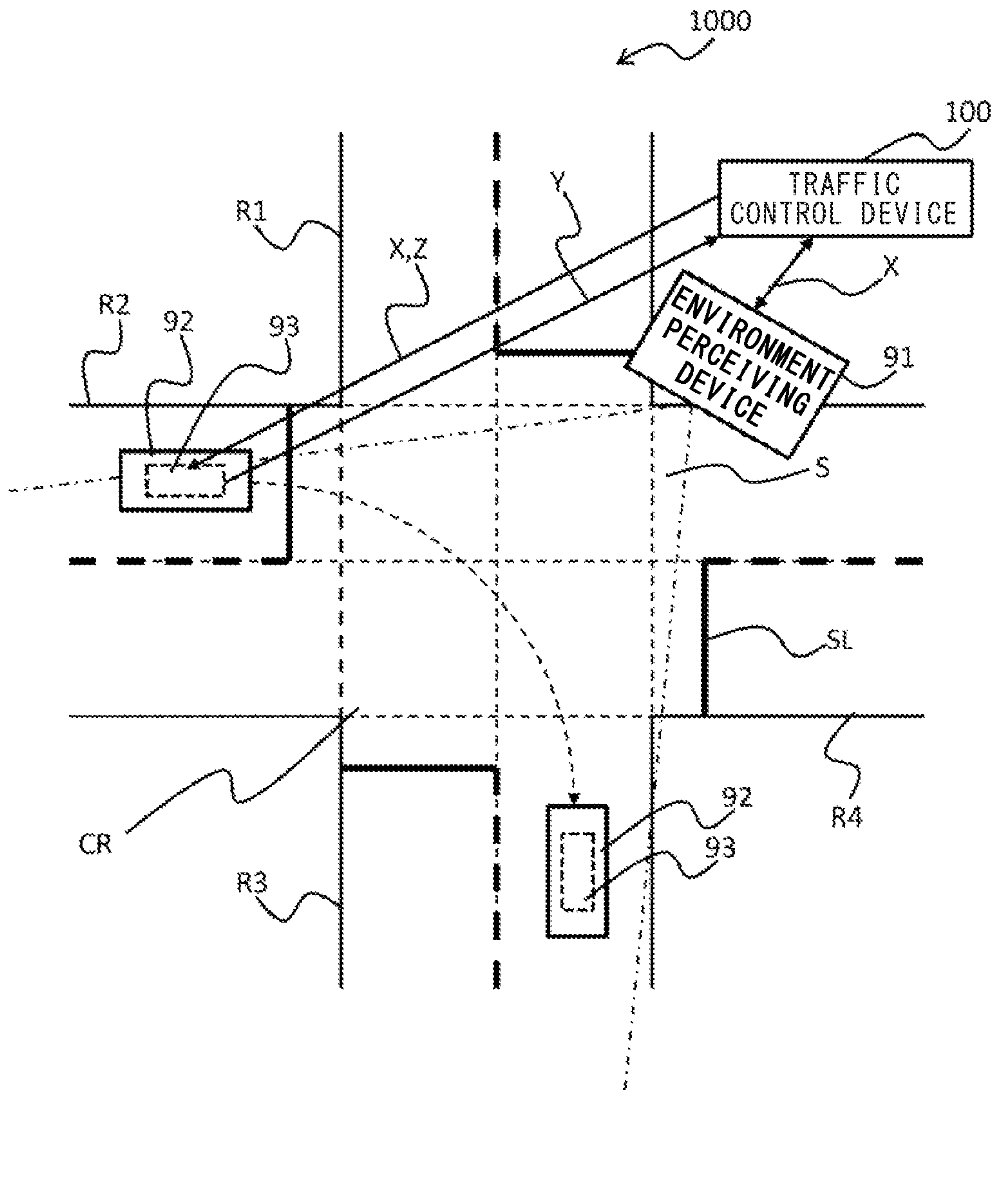
FIG. 1 is a schematic view showing a traffic control system according to a first embodiment.

A first embodiment will be described with reference to FIG. 1 to FIG. 28. FIG. 1 is a schematic view showing a traffic control system according to the first embodiment. A traffic control system 1000 includes a traffic control device 100. The traffic control device 100 transmits traffic situation information X to, and receives traffic situation information X from, a traffic environment perceiving device 91 (written as an "environment perceiving device" in FIG. 1) installed on a road side or the like of an intersection CR. Further, the traffic control device 100 receives target passage direction information Y from a vehicle 92 that passes through the intersection CR. Thus, the traffic control device 100 generates a command Z on the basis of the traffic situation information X and the target passage direction information Y and transmits the traffic situation information X and the command Z to the vehicle 92. Although only one traffic environment perceiving device 91 is shown in FIG. 1, a plurality of the traffic environment perceiving devices 91 may be present.

The traffic environment perceiving device 91 is equipped with a camera, a radar, and a communicator (none of which are shown). Within a perception range S thereof, the traffic environment perceiving device 91 acquires, in real time, information about the intersection CR and information about the number of vehicles 92 that are traveling or waiting in the intersection CR and in a region near the intersection CR, the shape, the location, and the speed of each vehicle 92, and the like. These pieces of information are each transmitted as the traffic situation information X to the traffic control device 100. As described later, if a plurality of the traffic environment perceiving devices 91 are present, the traffic environment perceiving devices 91 receive, from the traffic control device 100, pieces of traffic situation information X having been synchronized by the traffic control device 100.

The vehicle 92 is an autonomously-driven vehicle including a vehicle travel system 93 which controls travel of the vehicle 92. An operation of the vehicle 92 is based on a control command from the vehicle travel system 93, and communication between the vehicle 92 and the traffic control device 100 is also executed by the vehicle travel system 93. In the following explanations, description about processing inside the vehicle 92 will be omitted.

The vehicle 92 transmits, as target passage direction information Y, the passage direction (direction of straight advancement, left turn, or right turn) of the own vehicle in the intersection CR to the traffic control device 100. In addition, the vehicle 92 receives the traffic situation information X and the command Z from the traffic control device 100. As necessary, the vehicle 92 uses the traffic situation information X for controlling the own vehicle, and furthermore, the vehicle 92 enters the intersection CR at a delayed time point or waits in front of a stop line SL, on the basis of the command Z.

The traffic control device 100 collects, as information about each vehicle 92, vehicle information about the vehicle. Here, the "vehicle information" includes: the location and the speed of the vehicle 92 obtained from the traffic situation information X; and the passage direction of the vehicle 92 in the intersection CR obtained from the target passage direction information Y. If the vehicle 92 is waiting according to the command from the traffic control device 100, the vehicle information further includes a waiting period of the vehicle. In addition, the number of vehicles subsequent to the vehicle 92 is also acquired as vehicle information within a range that enables the acquisition.

In actuality, there are various intersections CR, and the intersection CR in the first embodiment is a crossroad at which roads having two lanes (in which two vehicles 92 can be placed in the width direction) intersect. The intersection CR is connected to four such roads. In FIG. 1, the road on the upper side in the drawing is defined as a road R1, the road on the left side in the drawing is defined as a road R2, the road on the lower side in the drawing is defined as a road R3, and the road on the right side in the drawing is defined as a road R4. Each of the roads R1, R2, R3, and R4 is provided with a stop line SL at a location that is apart from the intersection CR by a predetermined distance. Vehicles 92 in the first embodiment travel on the left side. Therefore, the stop line SL is also provided in the left-side lane out of the two lanes.

Figure 2:
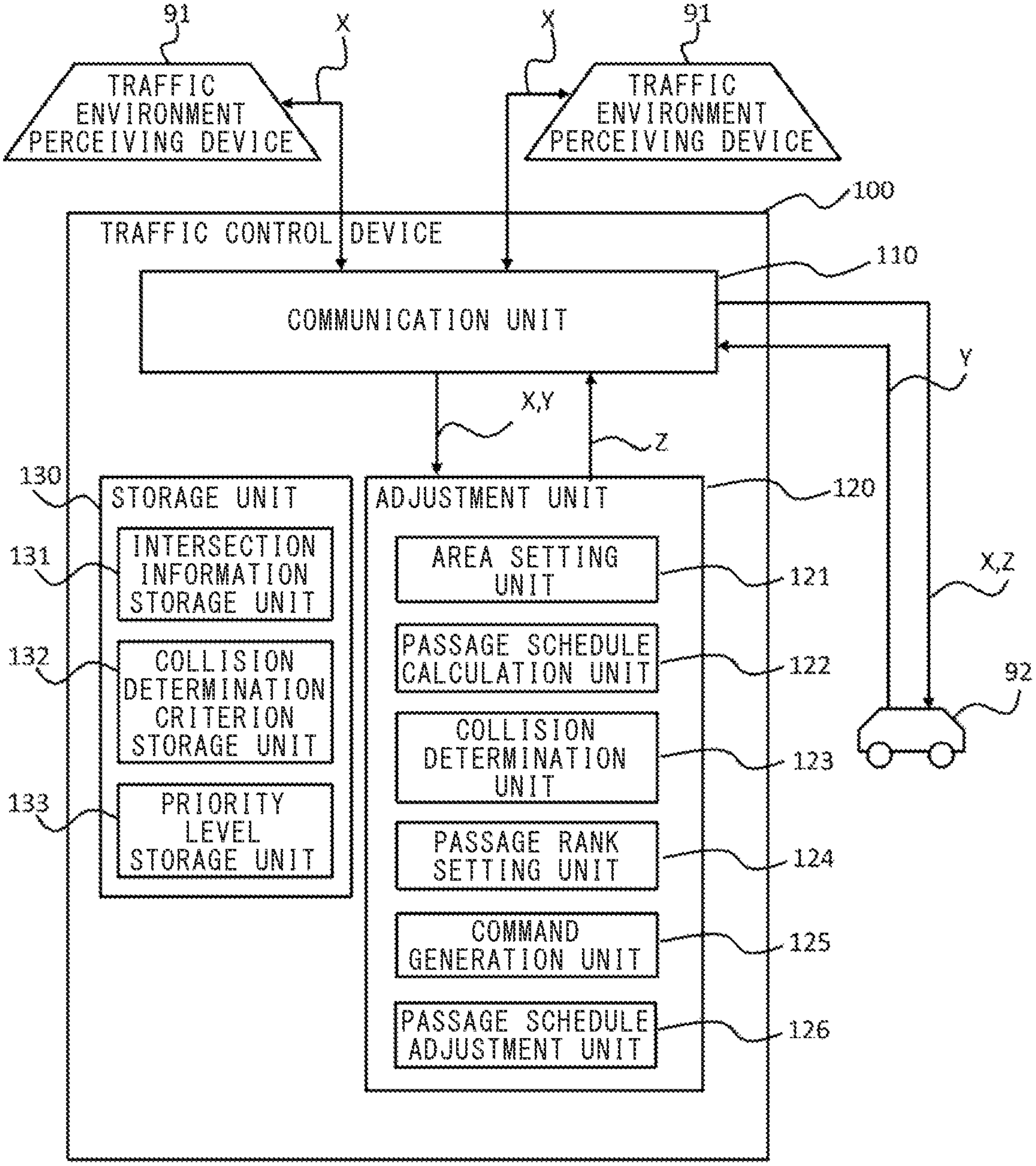
FIG. 2 is a block diagram showing a traffic control device according to the first embodiment.

FIG. 2 is a block diagram showing the traffic control device according to the first embodiment. The traffic control device 100 includes: a communication unit 110, i.e., a command transmission unit, which communicates with the traffic environment perceiving device 91 and a vehicle 92; an adjustment unit 120 which generates a command Z for adjusting the travel of the vehicle 92, on the basis of traffic situation information X and target passage direction information Y; and a storage unit 130 in which basic information used for generating the command Z is prestored.

The communication unit 110 receives pieces of traffic situation information X from one or a plurality of the traffic environment perceiving devices 91 and further receives pieces of target passage direction information Y from one or a plurality of the vehicles 92. The communication unit 110 transmits the traffic situation information X and the target passage direction information Y to the adjustment unit 120. In addition, the communication unit 110 transmits, to a synchronization unit (not shown), the pieces of traffic situation information X received from the plurality of respective traffic environment perceiving devices 91. The synchronization unit synchronizes the plurality of pieces of traffic situation information X received from the communication unit 110 and returns the synchronized pieces of traffic situation information X to the communication unit 110. The communication unit 110 transmits the synchronized pieces of traffic situation information X to the plurality of respective traffic environment perceiving devices 91. In this manner, if there are a plurality of the traffic environment perceiving devices 91, the pieces of traffic situation information X are synchronized by the traffic control device 100. Further, the communication unit 110 transmits the traffic situation information X (or the synchronized pieces of traffic situation information X) and commands Z to the vehicles 92.

The adjustment unit 120 includes: an area setting unit 121 which sets one or a plurality of "areas" in the intersection CR; a passage schedule calculation unit 122 which predicts and calculates a passage schedule according to which a vehicle 92 passes through the intersection CR; a collision determination unit 123 which determines, if a plurality of the vehicles 92 pass through the intersection CR, whether or not the vehicles 92 have a possibility of undergoing a collision; a passage rank setting unit 124 which sets, if the plurality of vehicles 92 pass through the intersection CR, passage ranks constituting a sequence according to which the respective vehicles 92 pass through the intersection CR; a command generation unit 125 which generates a command Z for each vehicle 92; and a passage schedule adjustment unit 126 which adjusts, as necessary, the passage schedule.

The area setting unit 121 sets one or a plurality of areas in the intersection CR on the basis of a predetermined criterion. The manner of setting areas differs depending on the type of the intersection CR. Here, the intersection CR is divided to set four areas. The number of the areas and a specific manner of division will be described later.

The passage schedule calculation unit 122 calculates, in each area having been set by the area setting unit 121, time points at which vehicles 92 that enter the intersection CR enter the area, and time points at which the vehicles 92 exit the area. Consequently, the passage schedule calculation unit 122 obtains time periods during which the area is kept as a passage-in-progress area and time periods during which the area is kept as a passage-scheduled area, to calculate passage schedules for the respective vehicles 92.

The collision determination unit 123 determines, on the basis of predetermined collision determination criteria and the passage schedules for the respective vehicles which have been calculated by the passage schedule calculation unit, whether or not the vehicles 92 have a possibility of undergoing a collision in the intersection CR.

If the collision determination unit 123 determines that there is the possibility of the collision, the passage rank setting unit 124 sets passage ranks constituting a sequence according to which the vehicles 92 pass through the intersection CR, on the basis of predetermined priority levels.

The command generation unit 125 generates commands Z for the respective vehicles 92 that enter the intersection CR, on the basis of the passage schedules calculated by the passage schedule calculation unit 122 or passage schedules obtained through adjustment by the passage schedule adjustment unit 126. The commands Z include: a maintaining command to cause passage through the intersection CR without any change from the present situation; an adjustment command to delay the time point of entry into the intersection CR; and a waiting command to temporarily stop entry into the intersection CR.

If the collision determination unit 123 determines that there is a possibility of a collision, the passage schedule adjustment unit 126 calculates an adjustment period through comparison between the passage schedules for the vehicles 92 determined to have the possibility of the collision, and performs passage schedule adjustment. The passage schedule adjustment will be described later.

The storage unit 130 includes an intersection information storage unit 131, a collision determination criterion storage unit 132, and a priority level storage unit 133.

The intersection information storage unit 131 stores therein information about the intersection CR and setting of the areas in the intersection CR. The intersection information storage unit 131 stores therein map information including data of the location (latitude and longitude) of the intersection CR and data of the shape of the intersection CR. The area setting unit 121 adds setting information (in the case of the first embodiment, information about division of the intersection CR) about the areas to the map information stored in the intersection information storage unit 131 and updates the map information about the intersection CR, to perform setting of the areas. The areas in the intersection CR are set before start of operation of the traffic control device 100. Therefore, it is assumed in the following explanations that the areas in the intersection CR have been preset.

The collision determination criterion storage unit 132 prestores therein collision determination criteria that are criteria for performing determination as to a collision by using the passage schedules for the vehicles 92. The collision determination unit 123 determines whether or not there is a possibility of a collision, on the basis of the collision determination criteria stored in the collision determination criterion storage unit 132. Specific content of the collision determination criteria will be described later.

The priority level storage unit 133 prestores therein priority levels for setting passage ranks for the vehicles 92 that pass through the intersection CR. The passage rank setting unit 124 sets passage ranks on the basis of the priority levels stored in the priority level storage unit 133. Specific content of the priority levels will be described later.

Figure 3:
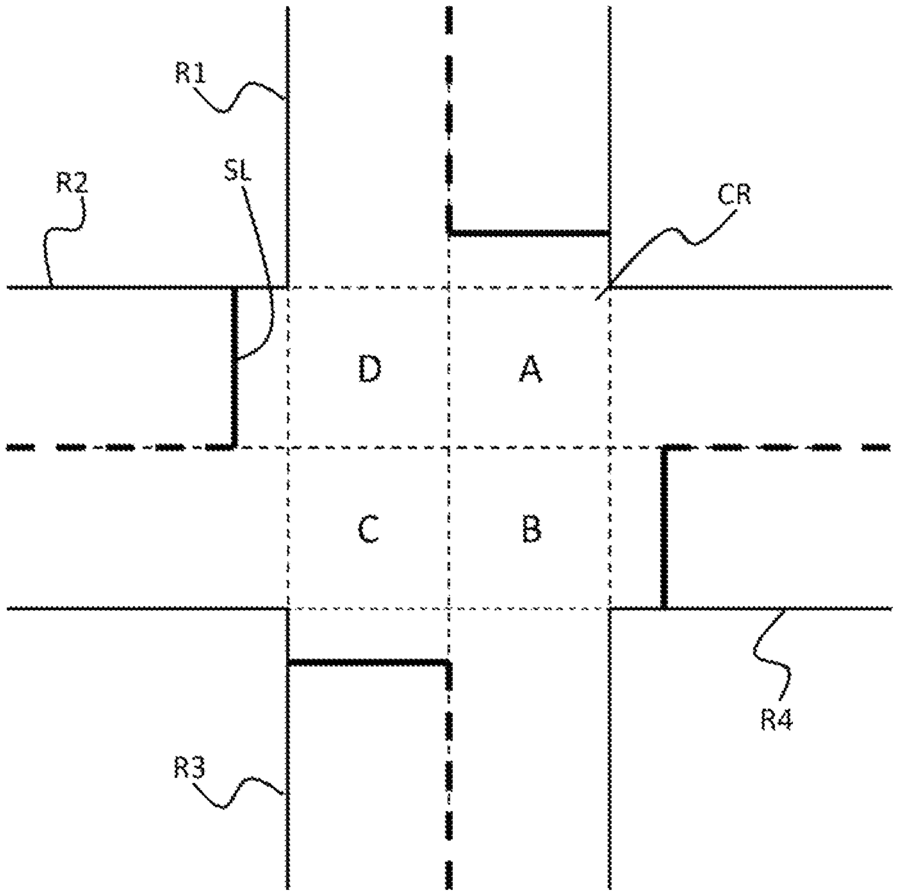
FIG. 3 is a diagram for explaining setting of areas in an intersection, and is a diagram for explaining the case where the intersection is a crossroad at which a two-lane road and a two-lane road intersect.

Setting of areas in an intersection CR will be described. FIG. 3 is a diagram for explaining setting of areas in an intersection, and is a diagram for explaining the case where the intersection is a crossroad at which a two-lane road and a two-lane road intersect. As shown in FIG. 3, the intersection CR has a width corresponding to two lanes in each of the up-down direction in the drawing and the left-right direction in the drawing. Thus, the intersection CR is divided into four equal areas by division lines which are: the center lines of the road R1 and the road R3 connected to the intersection CR; and the center lines of the road R2 and the road R4 connected to the intersection CR. By this division, four areas A, B, C, and D are set.

Each area that is set in the intersection CR by the area setting unit 121 has a width that allows at least one vehicle 92 to pass through the area. That is, the area has a width corresponding to at least one lane in a direction orthogonal to the direction of entry and exit performed by the vehicle 92. By setting the areas in this manner, the sequential passage through the areas adjacent to each other makes it possible to pass through the intersection CR in an arbitrarily-defined direction.

Figure 4:
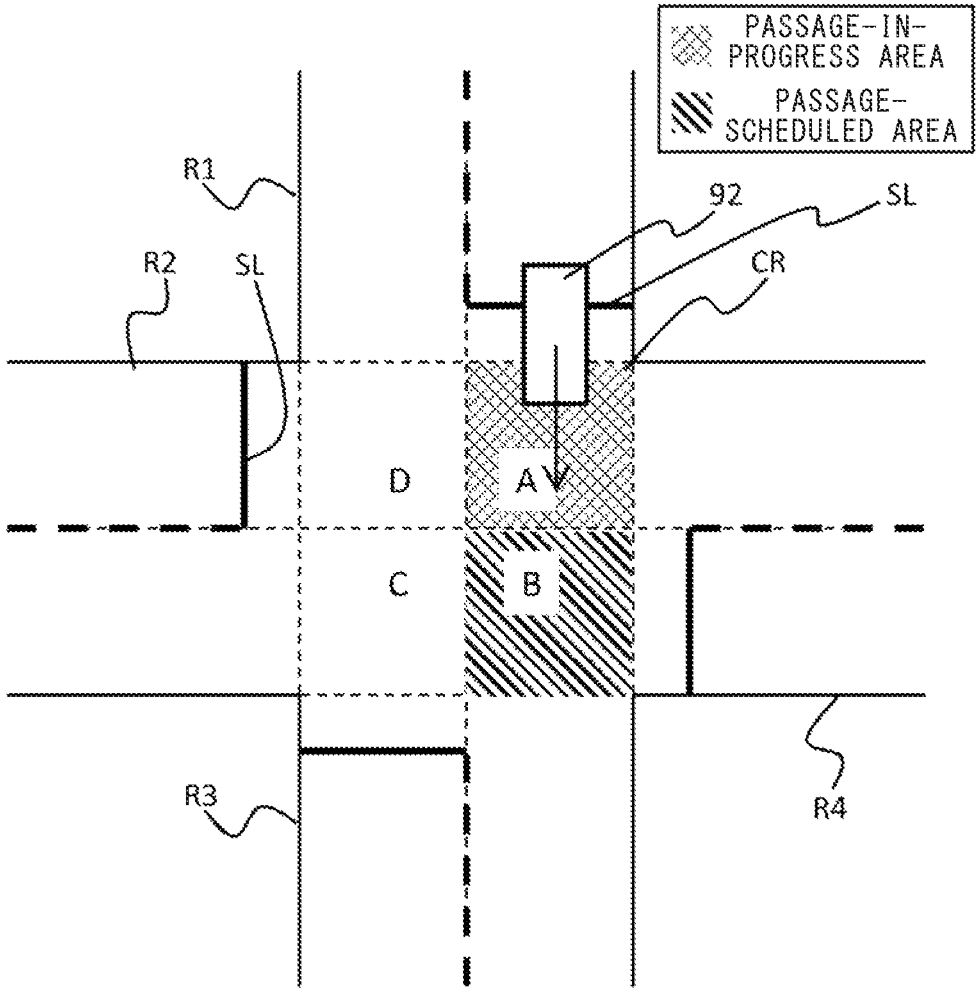
FIG. 4 is a diagram for explaining a passage-in-progress area and a passage-scheduled area in the first embodiment.

Next, a "passage-in-progress area" and a "passage-scheduled area" will be described. FIG. 4 is a diagram for explaining a passage-in-progress area and a passage-scheduled area in the first embodiment. In the example shown in FIG. 4, a vehicle 92 that straightly advances so as to pass through the intersection CR enters the intersection CR from the road R1. In this case, the vehicle 92 passes through the area A to the area B in this order. Upon start of the entry into the intersection CR, the vehicle 92 and the area A are in a situation of overlapping with each other, and the vehicle 92 is passing through the area A. An area through which a vehicle 92 is presently passing such as the area A in this case is defined as a "passage-in-progress area" and indicated by a rhombic grid. Meanwhile, the area B does not presently overlap with the vehicle 92, but the vehicle 92 passes through the area B before the vehicle 92 finishes passing through the intersection CR. In this manner, an area through which the vehicle 92 is not passing at the present time but passes subsequently to the present time before the vehicle 92 finishes passing through the intersection CR, is defined as a "passage-scheduled area" and indicated by diagonal stripes. When a certain vehicle passes through the intersection CR, areas to be set as the passage-in-progress area and the passage-scheduled area and an area to be set as neither of the areas, are determined according to the passage direction of the vehicle 92 and the road at which the vehicle 92 is located (the road from which entry into the intersection CR is performed). Further, a timing at which each area is set as the passage-in-progress area or the passage-scheduled area, is determined according to the passage direction of the vehicle 92, the road at which the vehicle 92 is located, and the speed of the vehicle 92.

Figure 5:
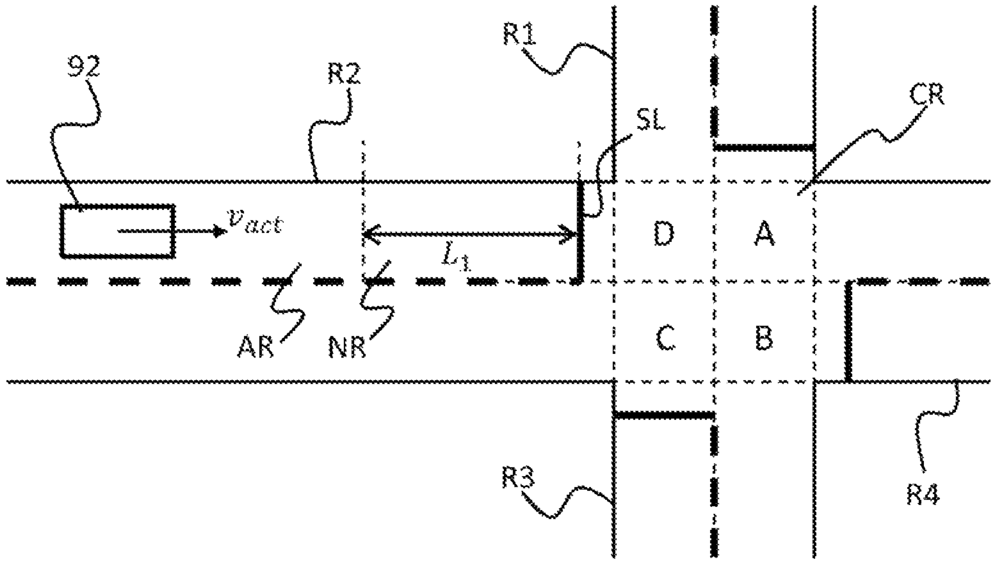
FIG. 5 is a diagram for explaining an adjustable area and an unadjustable area in the first embodiment.

Next, an "adjustable area" and an "unadjustable area" will be described. FIG. 5 is a diagram for explaining an adjustable area and an unadjustable area in the first embodiment. An adjustable area AR and an unadjustable area NR are set, for each of the roads R1, R2, R3, and R4, as regions that are apart more from the intersection CR than the corresponding stop line SL is. The unadjustable area NR is an area that extends for a distance L1 from the stop line SL. The unadjustable area NR is such a region that, if the vehicle 92 enters the unadjustable area NR, the vehicle 92 cannot stop before the stop line SL but crosses over the stop line SL. The adjustable area AR is a region that is apart more from the intersection CR than the unadjustable area NR is. The distance L1 defining the unadjustable area NR is determined according to a speed vact of the vehicle 92 that is approaching the intersection CR.

The adjustable area AR and the unadjustable area NR only have to be set by the area setting unit 121. The adjustable area AR and the unadjustable area NR are set when the traffic environment perceiving device 91 detects a frontmost vehicle 92 that is approaching the intersection CR on a certain road. The area setting unit 121 acquires a speed vact from the traffic situation information X, calculates a distance L1, and sets an adjustable area AR and an unadjustable area NR. However, if the vehicle 92 stops, the setting of the adjustable area AR and the unadjustable area NR is canceled. If the vehicle 92 starts traveling again, the adjustable area AR and the unadjustable area NR are set again.

Figure 6A:
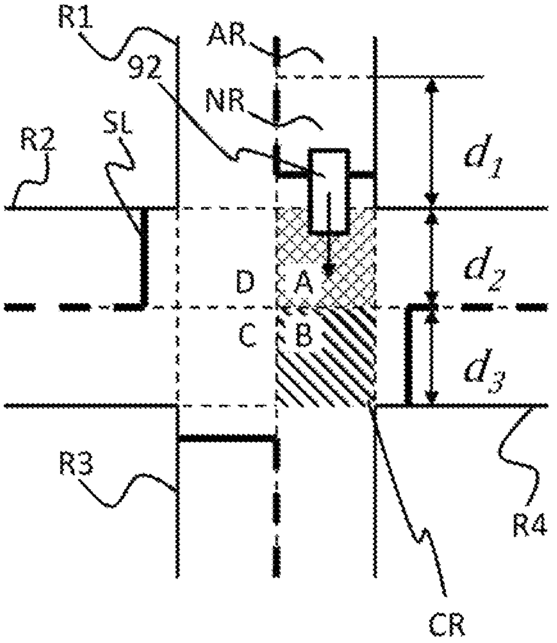
FIG. 6A is a diagram for explaining calculation of passage schedules.
Figure 6B:
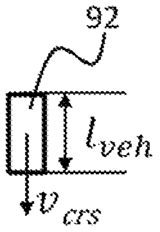
FIG. 6B is a diagram for explaining calculation of the passage schedules.
Figure 6C:
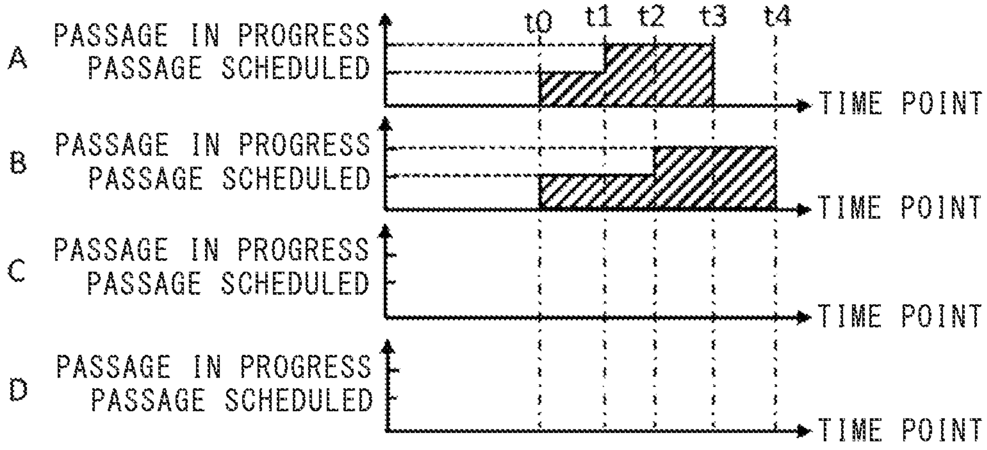
FIG. 6C is a diagram for explaining calculation of the passage schedules.

Next, calculation of passage schedules will be described. FIG. 6A to FIG. 6C are each a diagram for explaining calculation of passage schedules according to which a vehicle 92 passes through the intersection CR. FIG. 6A is a diagram showing distances defined in the intersection CR and in a region near the intersection CR. FIG. 6B is a diagram showing parameters of a vehicle 92 entering the intersection CR. FIG. 6C is a diagram showing passage schedules based on the situations shown in FIG. 6A and FIG. 6B. As shown in FIG. 6A, the vehicle 92 enters the intersection CR from the road R1, straightly advances so as to pass through the area A and the area B, and enters the road R3. The distance between the boundary between the adjustable area AR and the unadjustable area NR and the boundary between the intersection CR (area A) and the road R1 is defined as d1, the distance between the boundary between the area A and the road R1 and the boundary between the area A and the area B is defined as d2, and the distance between the boundary between the area A and the area B and the boundary between the area B and the road R3 is defined as d3.

As shown in FIG. 6B, the body length in the advancing direction of the vehicle 92 is defined as lveh, and the speed of the vehicle 92 is defined as vcrs. In this case, the following expression (1) to expression (4) are satisfied.

[Mathematical 1]

$$t_1 = \frac{d_1}{v_{crs}} + t_0 \tag{1}$$

[Mathematical 2]

$$t_2 = \frac{d_1 + d_2}{v_{crs}} + t_0 \tag{2}$$

[Mathematical 3]

$$t_3 = \frac{d_1 + d_2 + l_{veh}}{v_{crs}} + t_0 \tag{3}$$

[Mathematical 4]

$$t_4 = \frac{d_1 + d_2 + d_3 + l_{veh}}{v_{crs}} + t_0 \tag{4}$$

Here, t0 represents the time point at which the vehicle 92 enters the unadjustable area NR, t1 represents the time point at which the vehicle 92 enters the area A, t2 represents the time point at which the vehicle 92 enters the area B, t3 represents the time point at which the vehicle 92 exits the area A, and t4 represents the time point at which the vehicle 92 exits the area B.

From the above results, passage schedules in the respective areas are as shown in FIG. 6C. In each passage schedule, the horizontal axis indicates time point, and the vertical axis indicates whether the area is a passage-in-progress area or a passage-scheduled area. As shown in FIG. 6C, during the period from the time point t0 to the time point t1, both the area A and the area B are passage-scheduled areas. During the period from the time point t1 to the time point t2, the area A is a passage-in-progress area, but the area B is a passage-scheduled area. During the period from the time point t2 to the time point t3, both the area A and the area B are passage-in-progress areas. During the period from the time point t3 to the time point t4, the area A is neither a passage-in-progress area nor a passage-scheduled area, but the area B is a passage-in-progress area.

FIG. 6A to FIG. 6C show an example of the case where the vehicle 92 straightly advances so as to pass through the intersection CR. Meanwhile, in the case where the vehicle 92 turns right or left so as to pass through the intersection CR, the vehicle speed and the travel route of the vehicle 92 differ from those in the case of the straight advancement, and thus d1, d2, d3, and vcrs are adjusted as appropriate.

Figure 7A:
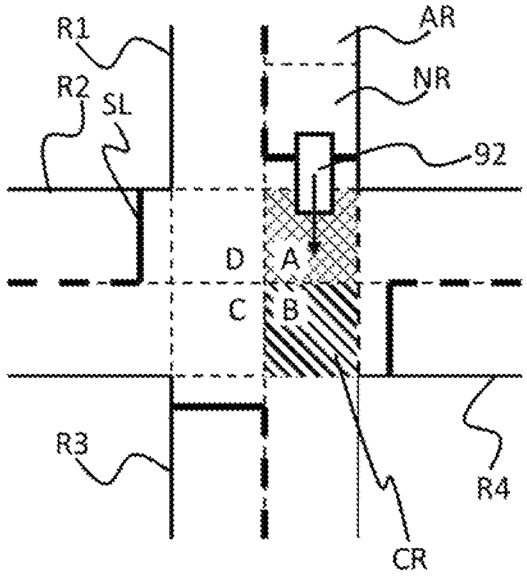
FIG. 7A is a diagram for explaining passage schedules in the case where a vehicle straightly advances in an intersection which is a crossroad.
Figure 7B:
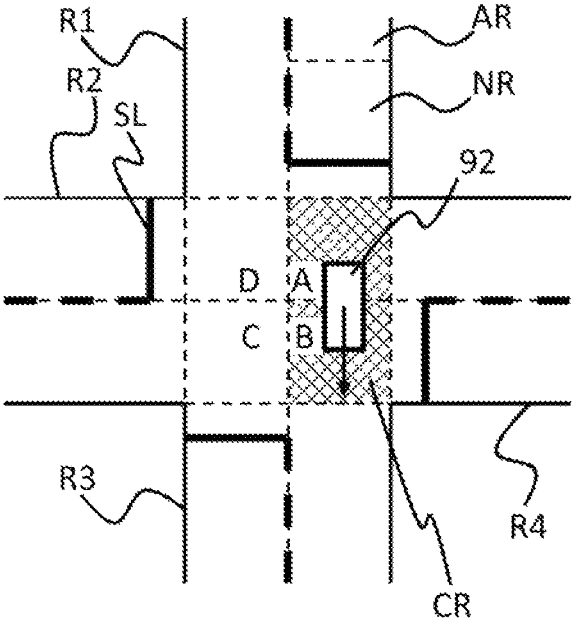
FIG. 7B is a diagram for explaining the passage schedules in the case where the vehicle straightly advances in the intersection.
Figure 7C:
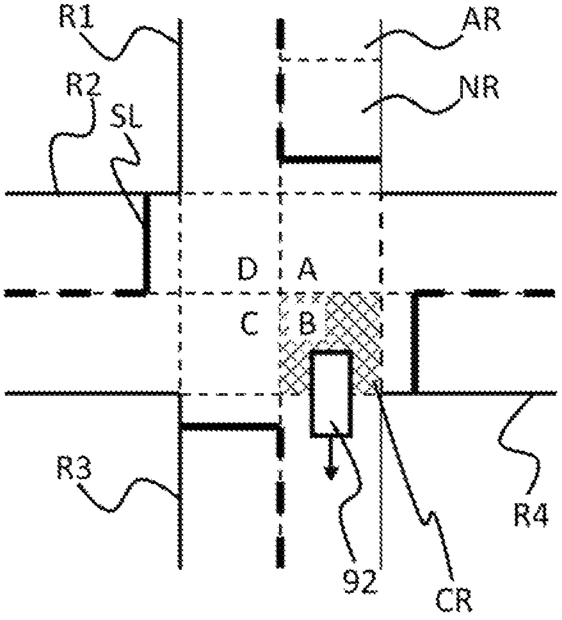
FIG. 7C is a diagram for explaining the passage schedules in the case where the vehicle straightly advances in the intersection which is a crossroad.
Figure 7D:
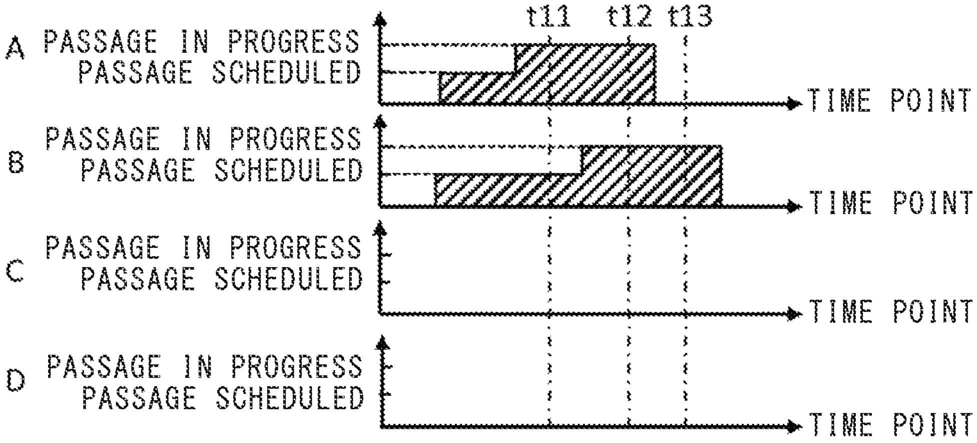
FIG. 7D is a diagram for explaining the passage schedules in the case where the vehicle straightly advances in the intersection.

Passage schedules in the case where a vehicle 92 straightly advances will be further described with reference to FIG. 7A to FIG. 7D. In the example shown in FIG. 7A to FIG. 7D as well, a vehicle 92 that enters the intersection CR from the road R1, straightly advances so as to pass through the area A and the area B and enters the road R3. A situation at a time point t11 after the vehicle 92 enters the area A is shown in FIG. 7A, a situation at a time point t12 after the vehicle 92 enters the area B is shown in FIG. 7B, and a situation at a time point t13 at which the vehicle 92 enters the road R3 is shown in FIG. 7C. In FIG. 7D, all passage schedules in the case where the vehicle 92 straightly advances are shown by area.

Figure 8A:
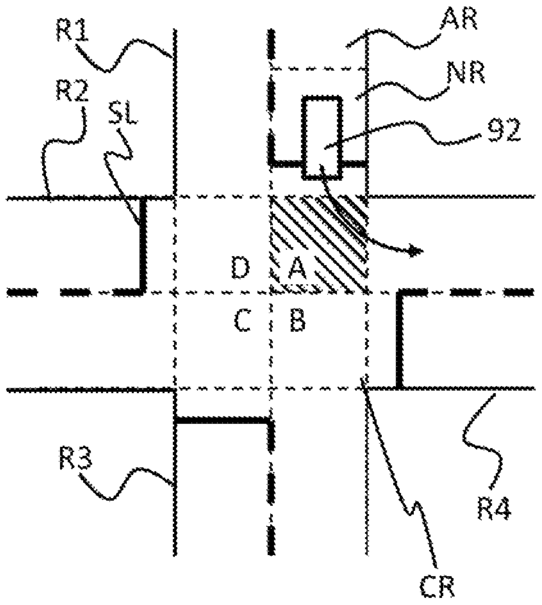
FIG. 8A is a diagram for explaining passage schedules in the case where the vehicle turns left in the intersection which is a crossroad.
Figure 8B:
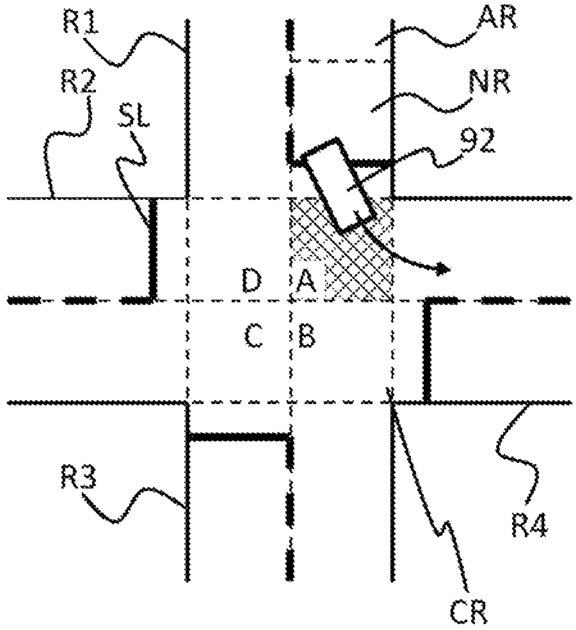
FIG. 8B is a diagram for explaining the passage schedules in the case where the vehicle turns left in the intersection.
Figure 8C:
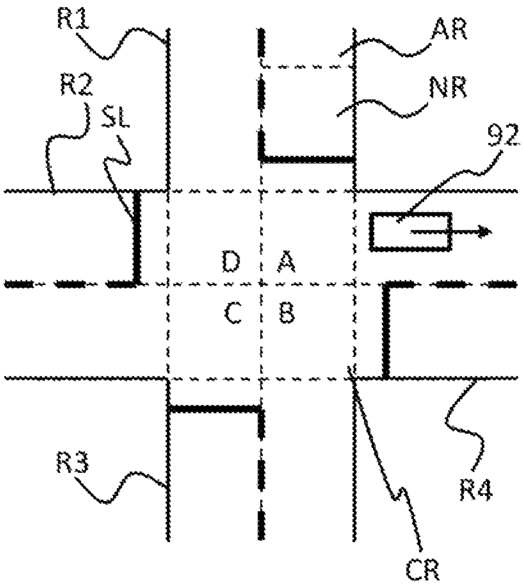
FIG. 8C is a diagram for explaining the passage schedules in the case where the vehicle turns left in the intersection.
Figure 8D:
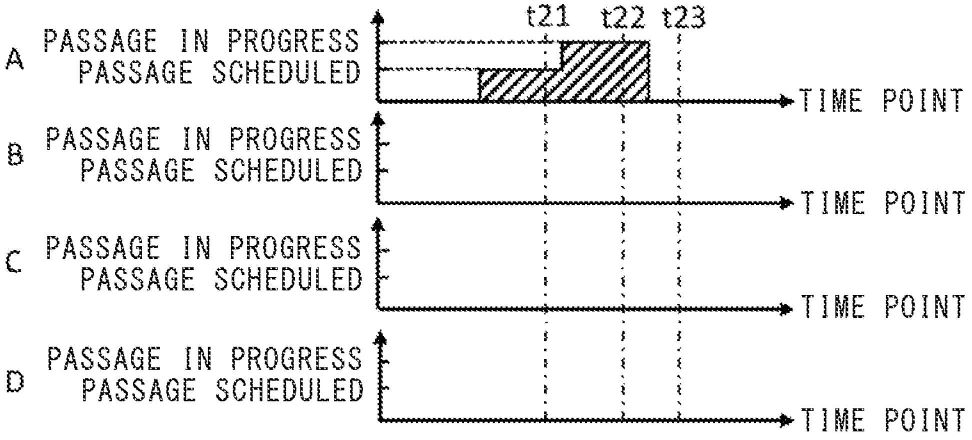
FIG. 8D is a diagram for explaining the passage schedules in the case where the vehicle turns left in the intersection.

Passage schedules in the case where a vehicle 92 turns left are shown in FIG. 8A to FIG. 8D. In the example shown in FIG. 8A to FIG. 8D, a vehicle 92 that enters the intersection CR from the road R1, turns left and enters the road R4. In this case, the vehicle 92 passes through only the area A. FIG. 8A shows a situation at a time point t21 immediately before the vehicle 92 enters the area A. FIG. 8B shows a situation at a time point t22 after the vehicle 92 enters the area A. FIG. 8C shows a situation at a time point t23 after the vehicle 92 exits the area A. In FIG. 8D, all passage schedules in the case where the vehicle 92 turns left are shown by area.

Figure 9A:
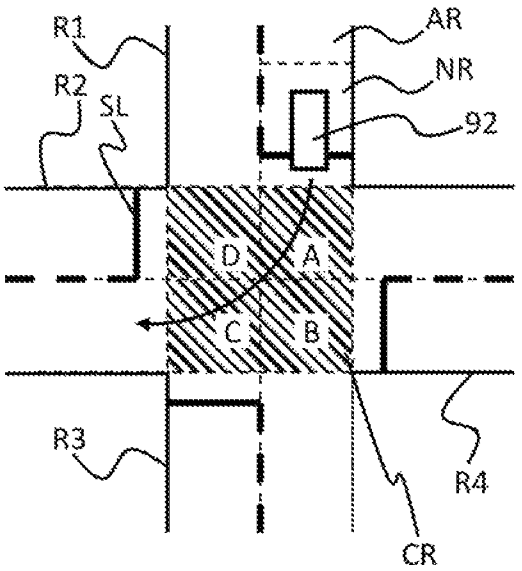
FIG. 9A is a diagram for explaining passage schedules in the case where the vehicle turns right in the intersection.
Figure 9B:
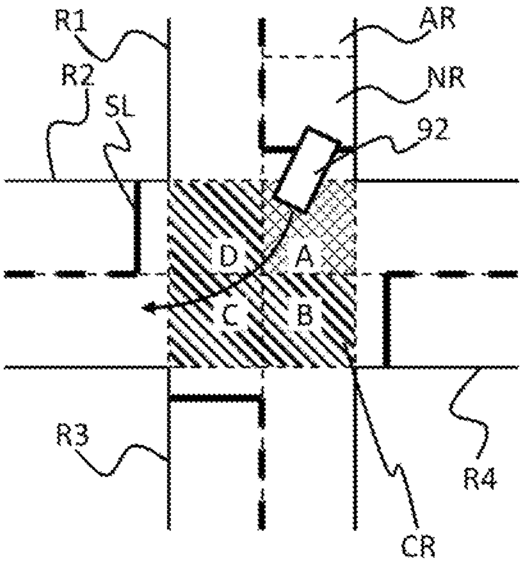
FIG. 9B is a diagram for explaining the passage schedules in the case where the vehicle turns right in the intersection.
Figure 9C:
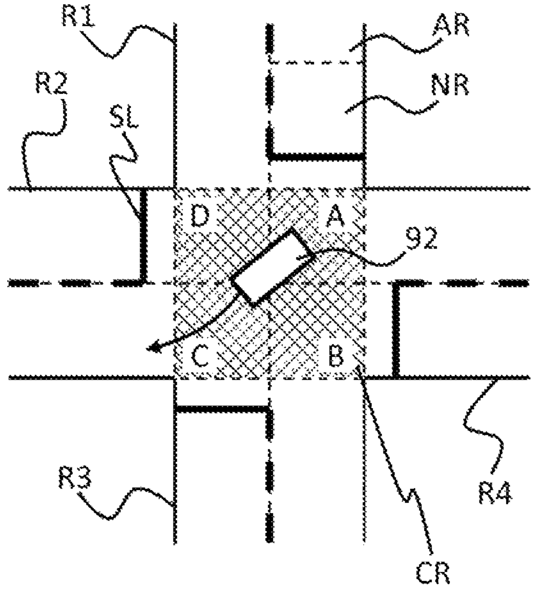
FIG. 9C is a diagram for explaining the passage schedules in the case where the vehicle turns right in the intersection.
Figure 9D:
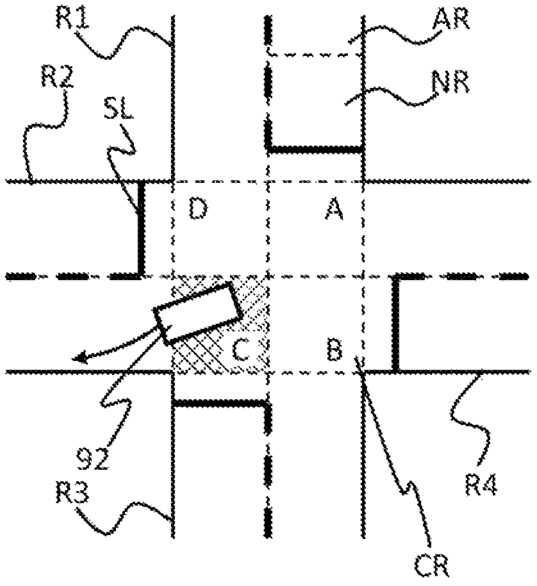
FIG. 9D is a diagram for explaining the passage schedules in the case where the vehicle turns right in the intersection.
Figure 9E:
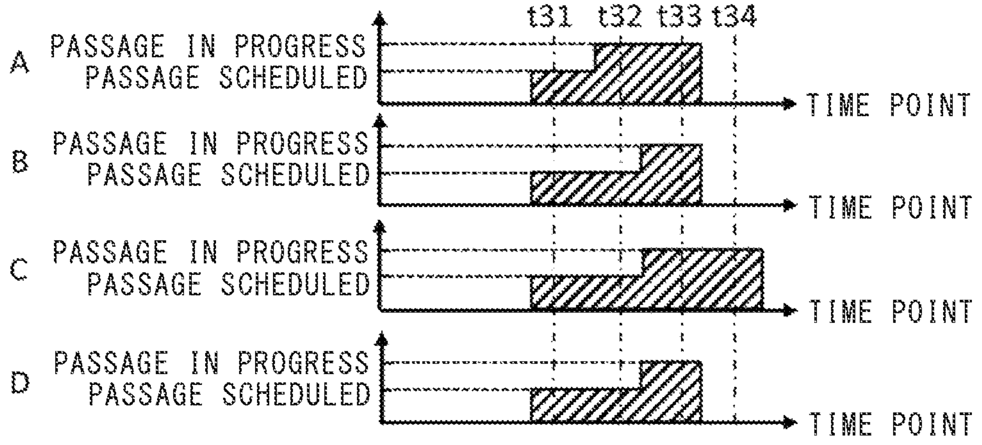
FIG. 9E is a diagram for explaining the passage schedules in the case where the vehicle turns right in the intersection.

Passage schedules in the case where a vehicle 92 turns right are shown in FIG. 9A to FIG. 9E. In the example shown in FIG. 9A to FIG. 9E, a vehicle 92 that enters the intersection CR from the road R1, turns right and enters the road R2. In this case, the vehicle 92 passes through all the areas. FIG. 9A shows a situation at a time point t31 immediately before the vehicle 92 enters the area A. FIG. 9B shows a situation at a time point t32 after the vehicle 92 enters the area A. FIG. 9C shows a situation at a time point t33 at which the vehicle 92 passes approximately through the center of the intersection CR. FIG. 9D shows a situation at a time point t34 at which the vehicle 92 enters the road R2. In FIG. 9E, all passage schedules in the case where the vehicle 92 turns right are shown by area. As described above, in the case of a right turn, the vehicle 92 passes through all the areas, and thus all the areas are passage-scheduled areas at the time point t31.

At the time point t32, only the area A is a passage-in-progress area, and the areas B, C, and D are passage-scheduled areas. At the time point t33, all the areas are passage-in-progress areas. At the time point t34, only the area C is a passage-in-progress area.

Figure 10:
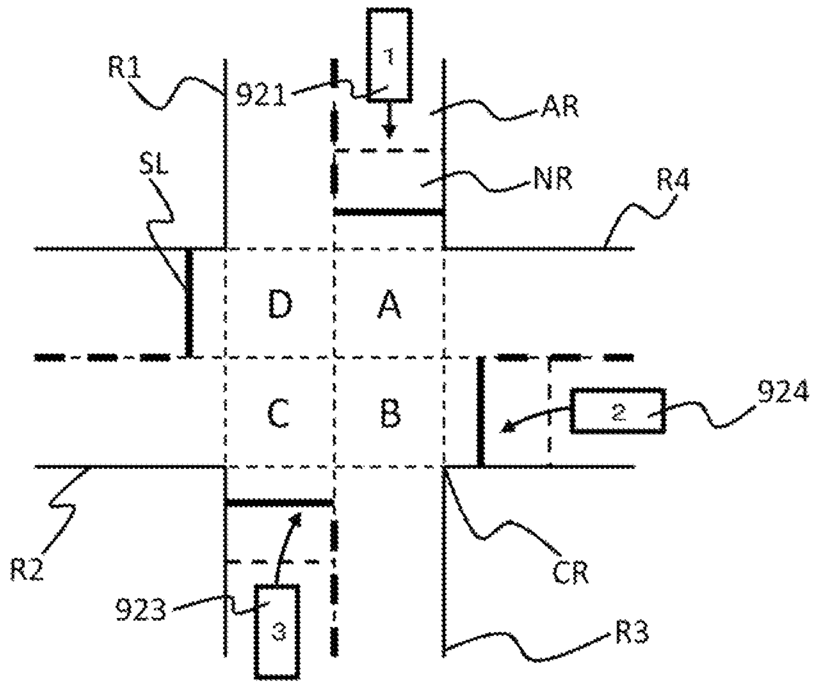
FIG. 10 is a diagram for explaining the case where a plurality of vehicles enter the intersection.

Next, the case where a plurality of the vehicles enter an intersection will be described. FIG. 10 is a diagram for explaining the case where the plurality of vehicles enter the intersection. For distinguishment, a vehicle that enters the intersection from the road R1 is defined as a vehicle 921, a vehicle that enters the intersection CR from the road R1 is defined as a vehicle 921, a vehicle that enters the intersection CR from the road R3 is defined as a vehicle 923, and a vehicle that enters the intersection CR from the road R4 is defined as a vehicle 924. The vehicle 921 straightly advances to pass through the intersection CR and enters the road R3. The vehicle 923 turns right to pass through the intersection CR and enters the road R4. The vehicle 924 turns left to pass through the intersection CR and enters the road R3. It is assumed that each of the vehicles 921, 923, and 924 is within the corresponding adjustable area AR and has not entered the corresponding unadjustable area NR. Since the vehicle 921 straightly advances, the vehicle 921 enters the intersection CR from the area A, and then passes through the area A and the area B in this order and enters the road R3 from the area B. Since the vehicle 923 turns right, the vehicle 923 enters the intersection from the area C and passes through all the areas, and then enters the road R4 from the area A. Since the vehicle 924 turns left, the vehicle 924 passes through only the area B.

The vehicle 921 is denoted by a numeral "1", the vehicle 923 is denoted by a numeral "3", and the vehicle 924 is denoted by a numeral "2". These numerals indicate passage ranks that are set after collision determination. The details of the passage ranks will be described later. It is assumed that the vehicles 921, 923, and 924 simultaneously enter the intersection CR first. The time point at which each vehicle starts moving toward the intersection CR, is defined as a time point tA.

Figure 11A:
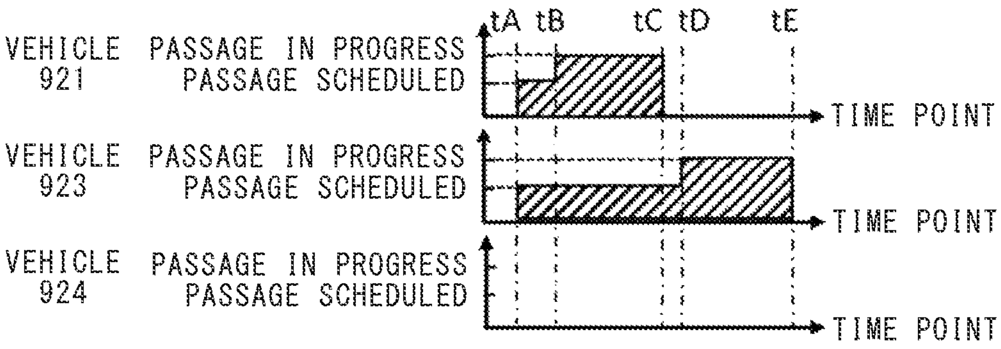
FIG. 11A is a diagram for comparison between passage schedules for the respective vehicles, and is a diagram for comparison between passage schedules for the respective vehicles in an area A.
Figure 11B:
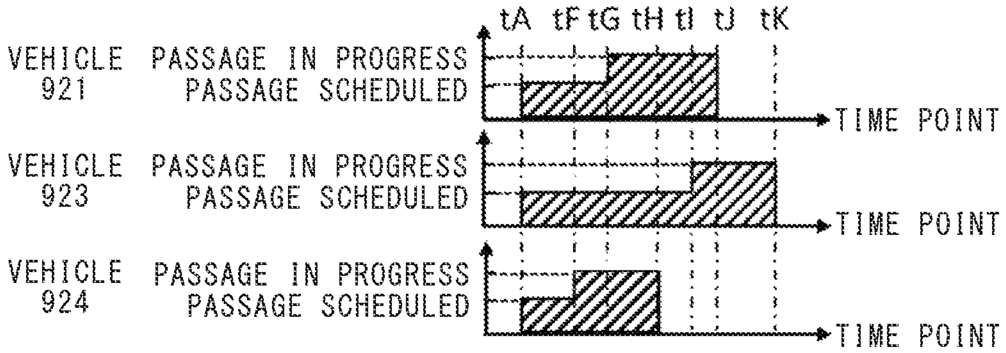
FIG. 11B is a diagram for comparison between passage schedules for the respective vehicles, and is a diagram for comparison between passage schedules for the respective vehicles in an area B.
Figure 11C:
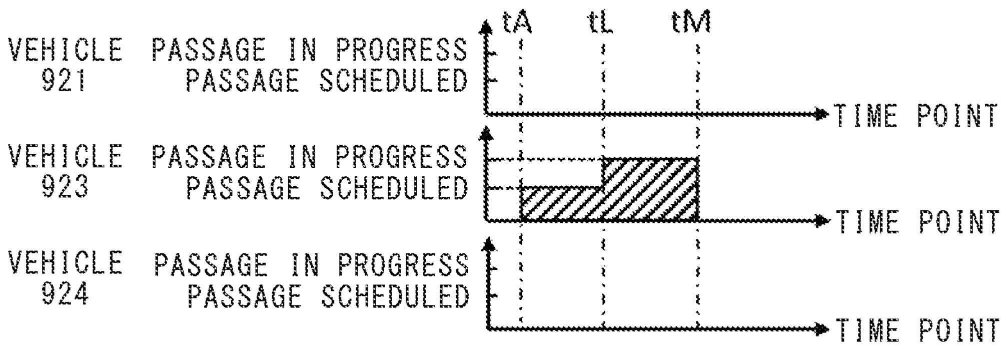
FIG. 11C is a diagram for comparison between passage schedules for the respective vehicles, and is a diagram for comparison between passage schedules for the respective vehicles in an area C.

Passage schedules in the example in FIG. 10 are shown in FIG. 11A to FIG. 11D. FIG. 11A is a diagram for comparison between passage schedules for the respective vehicles, and is a diagram for comparison between passage schedules for the respective vehicles in the area A. FIG. 11B is a diagram for comparison between passage schedules for the respective vehicles, and is a diagram for comparison between passage schedules for the respective vehicles in the area B. FIG. 11C is a diagram for comparison between passage schedules for the respective vehicles, and is a diagram for comparison between passage schedules for the respective vehicles in the area C. FIG. 11D is a diagram for comparison between passage schedules for the respective vehicles, and is a diagram for comparison between passage schedules for the respective vehicles in the area D. It is noted that each of the time points shown in FIG. 11A to FIG. 11D is an example for comparison.

The vehicle 921 and the vehicle 923 pass through the area A. Therefore, as shown in FIG. 11A, the area A is set as a passage-scheduled area for the vehicle 921 and the vehicle 923 at the time point tA. Thereafter, the vehicle 921 enters the area A at a time point tB, and the vehicle 921 exits the area A at a time point tC. Further, thereafter, the vehicle 923 enters the area A at a time point tD, and the vehicle 923 exits the area A at a time point tE. In this case, from the time point tA to the time point tB, the area A is a passage-scheduled area for the vehicle 921 and the vehicle 923. From the time point tB to the time point tC, the area A is a passage-in-progress area for the vehicle 921 and is a passage-scheduled area for the vehicle 923. From the time point tC to the time point tD, the area A is a passage-scheduled area for only the vehicle 923. From the time point tD to the time point tE, the area A is a passage-in-progress area for only the vehicle 923.

The vehicle 921, the vehicle 923, and the vehicle 924 pass through the area B. Therefore, as shown in FIG. 11B, the area B is set as a passage-scheduled area for the vehicle 921, the vehicle 923, and the vehicle 924 at the time point tA. Thereafter, the vehicle 924 enters the area B at a time point tF, and the vehicle 921 enters the area B at a time point tG. Thereafter, the vehicle 924 exits the area B at a time point tH, and the vehicle 923 enters the area B at a time point tI. Thereafter, the vehicle 921 exits the area B at a time point tJ, and the vehicle 923 exits the area B at a time point tK. In this case, from the time point tA to the time point tF, the area B is a passage-scheduled area for the vehicle 921, the vehicle 923, and the vehicle 924. From the time point tF to the time point tG, the area B is a passage-in-progress area for the vehicle 924 and is a passage-scheduled area for the vehicle 921 and the vehicle 923. From the time point tG to the time point tH, the area B is a passage-in-progress area for the vehicle 921 and the vehicle 924 and is a passage-scheduled area for the vehicle 923. From the time point tH to the time point tI, the area B is a passage-in-progress area for the vehicle 921 and is a passage-scheduled area for the vehicle 923. From the time point tI to the time point tJ, the area B is a passage-in-progress area for the vehicle 921 and the vehicle 923. From the time point tJ to the time point tK, the area B is a passage-in-progress area for only the vehicle 923.

Only the vehicle 923 passes through the area C. Therefore, as shown in FIG. 11C, the area C is set as a passage-scheduled area for the vehicle 923 at the time point tA. Thereafter, the vehicle 923 enters the area C at a time point tL. Thereafter, the vehicle 923 exits the area C at a time point tM. In this case, from the time point tA to the time point tL, the area C is a passage-scheduled area for only the vehicle 923. From the time point tL to the time point tM, the area C is a passage-in-progress area for only the vehicle 923.

Only the vehicle 923 passes through the area D. Therefore, as shown in FIG. 11D, the area D is set as a passage-scheduled area for the vehicle 923 at the time point tA. Thereafter, the vehicle 923 enters the area D at a time point tN. Thereafter, the vehicle 923 exits the area D at a time point tP. In this case, from the time point tA to the time point tN, the area D is a passage-scheduled area for only the vehicle 923. From the time point tN to the time point tP, the area D is a passage-in-progress area for only the vehicle 923.

The collision determination unit 123 performs, in each area, comparison between the passage schedules for the respective vehicles, to determine whether or not there is a possibility of a collision. FIG. 12 is a diagram showing an example of the collision determination criteria in the first embodiment. As shown in FIG. 12, in each of the case where the same area is set as a passage-in-progress area for a plurality of vehicles at the same time point and the case where the same area is set as a passage-scheduled area for a plurality of vehicles at the same time point, the collision determination unit 123 determines that there is a possibility of a collision. In other words, in the case where a time period during which a specific area is kept as a passage-in-progress area for a first vehicle among a plurality of vehicles 92 and a time period during which the specific area is kept as a passage-in-progress area for a second vehicle different from the first vehicle among the plurality of vehicles 92 overlap with each other, or in the case where a time period during which the specific area is kept as a passage-scheduled area for the first vehicle and a time period during which the specific area is kept as a passage-scheduled area for the second vehicle overlap with each other, the first vehicle and the second vehicle are determined to have a possibility of a collision. Meanwhile, in the case where the same area is set as a passage-in-progress area (passage-scheduled area) for one vehicle and a passage-scheduled area (passage-in-progress area) for another vehicle at the same time point, it is determined that there is no possibility of a collision.

Although not shown in FIG. 12, determination that there is no possibility of a collision is performed also in the case where an area is a passage-in-progress area or a passage-scheduled area for one vehicle among vehicles being compared but is neither a passage-in-progress area nor a passage-scheduled area for another vehicle among the vehicles being compared. It is noted that the reason why determination that there is a possibility of a collision is performed in the case of the combination of a passage-scheduled area and a passage-scheduled area is because there is a possibility that, if a passage time point of one vehicle is shifted for some reason, the passage time point overlaps with a passage time point of another vehicle. Further, the reason why determination that there is no possibility of a collision is performed in the case of the combination of a passage-in-progress area and a passage-scheduled area is because it is considered that, if an area is a passage-in-progress area for one vehicle, the vehicle immediately exits the area.

Determination as to a possibility of a collision in the example in FIG. 10 is performed on the basis of the collision determination criteria shown in FIG. 12. As described above, from the time point tA to the time point tB, the area A is a passage-scheduled area for the vehicle 921 and the vehicle 923. Thus, it is determined that the vehicle 921 and the vehicle 923 have a possibility of undergoing a collision in the area A. From the time point tA to the time point tF, the area B is a passage-scheduled area for the vehicle 921, the vehicle 923, and the vehicle 924. In addition, from the time point tF to the time point tG, the area B is a passage-scheduled area for the vehicle 921 and the vehicle 923. Further, from the time point tG to the time point tH, the area B is a passage-in-progress area for the vehicle 921 and the vehicle 924. Moreover, from the time point tI to the time point tJ, the area B is a passage-in-progress area for the vehicle 921 and the vehicle 923.

Judging from the above situations, it is determined that the vehicle 921 and the vehicle 923 have the possibility of the collision in the area A. Meanwhile, it is determined that the vehicle 921, the vehicle 923, and the vehicle 924 have the possibilities of the collisions in the area B. Since only the vehicle 923 passes through the area C and the area D, there is no possibility of a collision in the area C and the area D.

As described above, there are the possibilities of occurrence of the collisions in the example shown in FIG. 10. Thus, the passage time points of the vehicles need to be adjusted such that no collision occurs. In the first embodiment, if the collision determination unit 123 determines that there is a possibility of a collision, passage ranks are set for the respective vehicles according to predetermined priority levels. After the passage ranks are set, determination is made as to the extent of delaying the passage time points of the vehicles that pass through the intersection CR, subsequently. When the passage rank setting unit 124 receives, from the collision determination unit 123, a determination result indicating that there is a possibility of a collision, the passage rank setting unit 124 reads the predetermined priority levels from the priority level storage unit 133, and sets, with reference to the traffic situation information X and the target passage direction information Y, a sequence according to which the vehicles pass through the intersection CR. It is noted that, although various priority levels are contemplated as the "predetermined priority levels", the priority levels shown in FIG. 13 are set in the first embodiment. In the priority levels shown in FIG. 13, a smaller numeral indicates a higher priority level and leads to setting of a higher passage rank. That is, a vehicle that satisfies the condition of a priority level having a smaller numeral, further takes precedence in passing through the intersection CR.

If a certain vehicle satisfies the conditions of a plurality of priority levels, the highest priority level thereamong is applied. If a plurality of vehicles satisfy the condition of a same priority level and these vehicles have a possibility of a collision, a vehicle that satisfies the condition of the highest priority level among priority levels lower than the same priority level is considered to have the highest priority level. Even in the case of the same priority level, if there is no possibility of a collision, the passage ranks may also be the same.

A priority level 1 is a priority level based on the location of a vehicle. A vehicle having already entered an unadjustable area NR cannot stop before the stop line SL and, ordinarily, has already received a command Z to pass through the intersection CR. Thus, the vehicle is set to pass therethrough with the highest priority. A priority level 2 to a priority level 8 are each a priority level based on a traffic situation. A "default priority level in intersection" is a priority level according to which, for example, a road in the East-West direction takes priority over a road in the North-South direction. The default priority level is set for each intersection CR. However, it is assumed that no default priority level has been set for the intersection CR in the first embodiment.

It is noted that the priority levels shown in FIG. 13 are priority levels for setting passage ranks for the vehicles that enter the intersection CR from the different roads. Among a plurality of vehicles traveling on the same road, a vehicle closer to the intersection CR is given a higher priority level such that the frontmost vehicle passes through the intersection CR first.

If passage ranks are set for the respective vehicles in the example in FIG. 10 on the basis of the above priority levels, there are no vehicles that correspond to the priority levels 1 to 3, but the vehicle 921 satisfies the condition of the priority level 4 and the vehicle 924 satisfies the condition of the priority level 5. Further, the vehicle 923 satisfies the condition of the priority level 6. Therefore, higher passage ranks are given to, in the order of, the vehicle 921, the vehicle 924, and the vehicle 923.

After the passage ranks are set by the passage rank setting unit 124, the passage schedule adjustment unit 126 performs adjustment of delaying the time point at which a vehicle having a low passage rank enters the intersection CR, such that no collision occurs. In each of the areas, this adjustment is performed on each of the vehicles having a possibility of undergoing a collision. Then, an overall adjustment period T is ultimately determined such that a collision does not occur in any of the areas. In the above example in FIG. 10, there are the possibilities of occurrence of the collisions in the area A and the area B. Thus, for each vehicle, adjustment periods are obtained respectively in the area A and the area B. Then, the adjustment periods in the respective areas are compared to determine an overall adjustment period T for the vehicle.

Figure 14A:
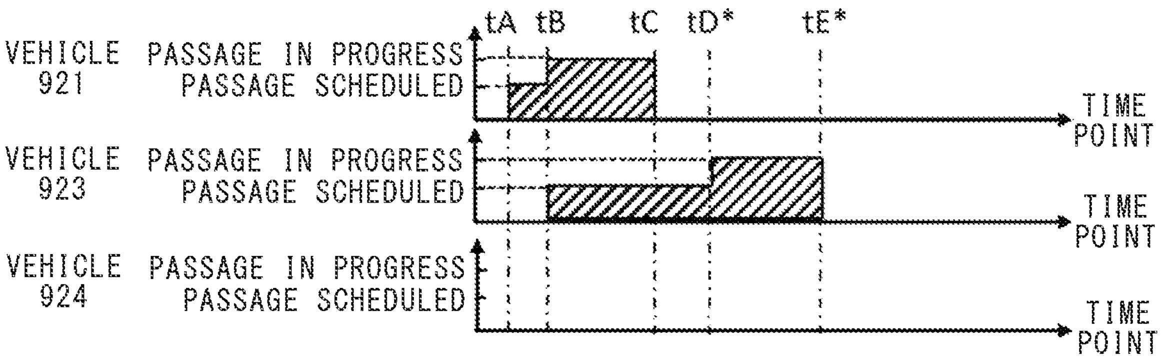
FIG. 14A is a diagram showing post-adjustment passage schedules in the area A.

Regarding the area A, the area A is the passage-scheduled area for the vehicle 921 and the vehicle 923 from the time point tA to the time point tB, and thus the vehicle 921 and the vehicle 923 are determined to have a possibility of a collision. Judging from FIG. 11A, the time point at which the vehicle 923 having a lower passage rank than the vehicle 921 enters the intersection CR needs to be delayed by at least (tB-tA) in order to avoid the collision. The period by which delay is performed on the vehicle having a lower passage rank in this manner, is defined as an adjustment period TA. Since the adjustment period TA is preferably short for smooth passing, the adjustment period TA for the vehicle 923 in area A is (tB−tA). Passage schedules for the respective vehicles in the area A in the case where the time point at which the vehicle 923 enters the intersection CR is delayed by the adjustment period TA (=tB−tA), are shown in FIG. 14A. In FIG. 14A, time points tD* and tE* are the time point at which the vehicle 923 enters the area A and the time point at which the vehicle 923 exits the area A which are obtained in the case where the time point at which the vehicle 923 enters the intersection CR is delayed by the adjustment period TA as described above. tD*=tD+tB−tA and tE*=tE+tB−tA are satisfied.

Regarding the area B, the area B is the passage-scheduled area for the vehicle 921 and the vehicle 923 from the time point tA to the time point tG, and the area B is the passage-in-progress area for the vehicle 921 and the vehicle 923 from the time point tI to the time point tJ, and thus the vehicle 921 and the vehicle 923 are determined to have a possibility of a collision. Further, the area B is the passage-scheduled area for the vehicle 921 and the vehicle 924 from the time point tA to the time point tF, and the area B is the passage-in-progress area for the vehicle 921 and the vehicle 924 from the time point tG to the time point tH, and thus the vehicle 921 and the vehicle 924 are determined to have a possibility of a collision. Further, the area B is the passage-scheduled area for the vehicle 923 and the vehicle 924 from the time point tA to the time point tF, and thus the vehicle 923 and the vehicle 924 are determined to have a possibility of a collision. Therefore, it is determined that three vehicles, i.e., the vehicle 921, the vehicle 923, and the vehicle 924, have a possibility of a collision from the time point tA to the time point tF.

If three or more vehicles are considered to have a possibility of a collision in this manner, adjustment is performed from vehicles having high passage ranks. That is, avoidance of the collision between the vehicle 921 and the vehicle 924 is contemplated first. Judging from FIG. 11B, in order to avoid the collision between the vehicle 921 and the vehicle 924, the time point at which the vehicle 924 enters the intersection CR needs to be delayed by at least (tJ-tF) such that the time point at which the vehicle 924 having a lower passage rank than the vehicle 921 enters the area B (time point tF) coincides with or becomes later than the time point at which the vehicle 921 exits the area B (time point tJ). As described above, the adjustment period is preferably short, and thus an adjustment period TB1 for the vehicle 924 in the area B is (tJ-tF). It is noted that the reason why adjustment is performed from vehicles having high passage ranks is because, if adjustment of the passage schedules for vehicles having low passage ranks is performed first, there is a possibility that the adjustment of the passage schedules for the vehicles having low passage ranks needs to be performed again depending on the result of adjustment, of the passage schedules for the vehicles having high passage ranks, that is subsequently performed.

Next, avoidance of the collision between the vehicle 923 and the vehicle 924 is contemplated. At this time, the passage schedule for the vehicle 924 is assumed to have been adjusted as described above. Strictly speaking, adjustment of the passage schedules for a vehicle having a low passage rank is performed after: adjustment of the passage schedules for a vehicle having a high passage rank has been completed in all the areas; and overall schedules for the vehicle having a high passage rank have been adjusted. However, since adjustment of the passage schedule for the vehicle 924 is performed only in the area B as described later, it may be considered that an overall passage schedule has been adjusted by means of the adjustment of the passage schedule in area B. Judging from FIG. 11B, in order to avoid the collision between the vehicle 923 and the vehicle 924, the time point at which the vehicle 923 enters the intersection CR needs to be delayed such that the time point at which the vehicle 923 having a lower passage rank than the vehicle 924 enters the intersection CR coincides with or becomes later than the time point at which the vehicle 924 enters the area B. Here, the time point at which the vehicle 924 enters the area B in the case where the time point at which the vehicle 924 enters the intersection CR is delayed by (tJ−tF), is the time point tJ, and thus the time point at which the vehicle 923 enters the intersection CR needs to be delayed by at least (tJ−tA). As described above, the adjustment period is preferably short, and thus an adjustment period TB2 for the vehicle 923 in the area B is (tJ−tA).

Figure 14B:
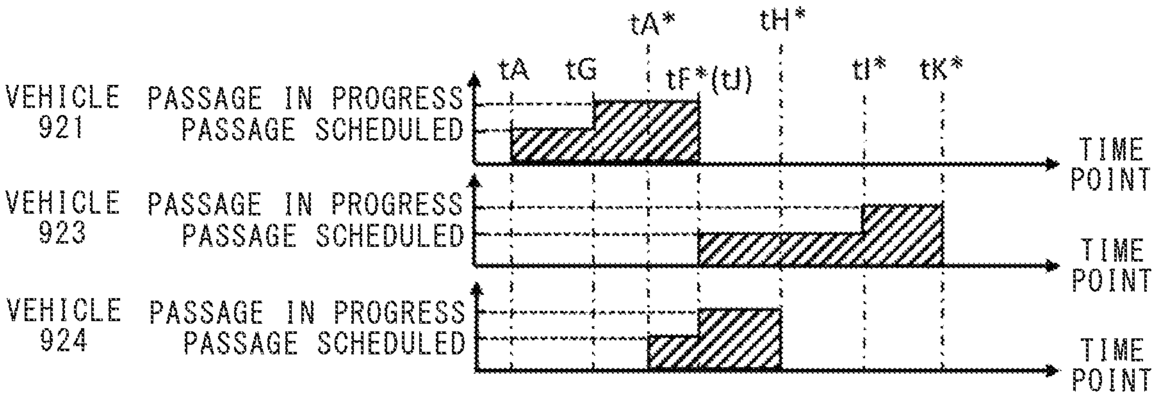
FIG. 14B is a diagram showing post-adjustment passage schedules in the area B.

FIG. 14B shows the passage schedules for the respective vehicles in the area B in the case where: the time point at which the vehicle 923 enters the intersection CR is delayed by the adjustment period TB2 (=tJ−tA); and the time point at which the vehicle 924 enters the intersection CR is delayed by the adjustment period TB1 (=tJ−tF). In FIG. 14B, a time point tA* is the time point at which the vehicle 924 enters the intersection CR in the case where the time point at which the vehicle 924 enters the intersection CR is delayed by the adjustment period TB1 as described above. tA*=tA+tJ−tF is satisfied. A time point tF* is the time point at which the vehicle 924 enters the area B in the case where the time point at which the vehicle 924 enters the intersection CR is delayed by the adjustment period TB1. tF*=tF+tJ−tF=tJ is satisfied, and thus the time point tF* coincides with the time point tJ. A time point tH* is the time point at which the vehicle 924 exits the area B in the case where the time point at which the vehicle 924 enters the intersection CR is delayed by the adjustment period TB1. tH*=tH+tJ−tF is satisfied. Time points tI* and tK* are respectively the time point at which the vehicle 923 enters the area B and the time point at which the vehicle 923 exits the area B in the case where the time point at which the vehicle 923 enters the intersection CR is delayed by the adjustment period TB2. tI*=tI+tJ−tA and tK*=tK+tJ−tA are satisfied.

For a certain vehicle 92, adjustment periods in all the areas are calculated, and then, by comparing the adjustment periods in the respective areas, the longest adjustment period thereamong is set as an adjustment period to be applied to the vehicle 92. For the vehicle 924, only the adjustment period TB1 in the area B has been calculated, and thus the overall passage schedule is adjusted by using the adjustment period TB1 (=tJ−tF) calculated in the area B. That is, the time point at which the vehicle 924 enters the intersection CR is delayed by (tJ−tF).

For the vehicle 923, the adjustment periods TA and TB2 have been calculated respectively in the area A and the area B, and thus, by comparing the adjustment period TA (=tB−tA) calculated in the area A and the adjustment period TB2 (=tJ−tA) calculated in the area B, the overall passage schedule is adjusted by using the longer adjustment period. That is, if the adjustment period TA is longer than the adjustment period TB2, the time point at which the vehicle 923 enters the intersection CR is delayed by (tB−tA), and meanwhile, if the adjustment period TB2 is longer than the adjustment period TA, the time point at which the vehicle 923 enters the intersection CR is delayed by (tJ−tA).

Figure 15A:
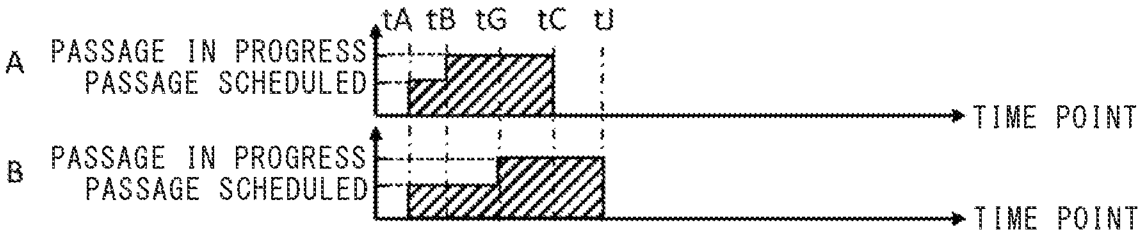
FIG. 15A is a diagram showing passage schedules, for a vehicle 921, which are obtained after passage schedule adjustment is performed.
Figure 15B:
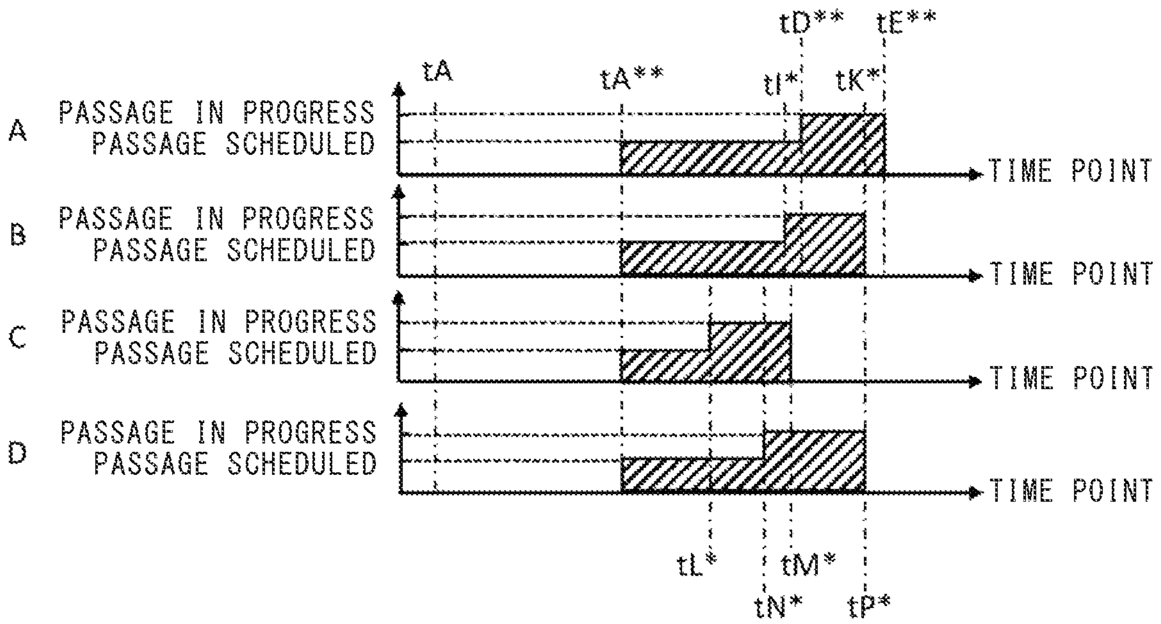
FIG. 15B is a diagram showing passage schedules, for a vehicle 923, which are obtained after passage schedule adjustment is performed.
Figure 15C:
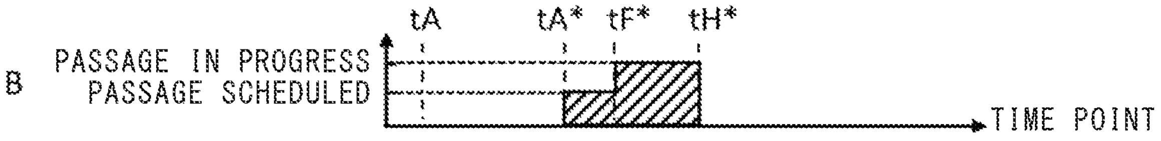
FIG. 15C is a diagram showing passage schedules, for a vehicle 924, which are obtained after passage schedule adjustment is performed.

Passage schedules for each vehicle obtained after passage schedule adjustment is performed are shown in FIG. 15A to FIG. 15C. It is noted that FIG. 15A to FIG. 15C show overall passage schedules for each vehicle by area but do not show the areas through which the vehicle does not pass. Regarding the passage schedules for the vehicle 923, adjustment of the passage schedules for the vehicle 923 is performed by using the adjustment period TB2 (tJ−tA) on the assumption that the adjustment period TB2 in the area B is longer than the adjustment period TA in the area A.

FIG. 15A shows passage schedules for the vehicle 921 obtained after passage schedule adjustment is performed. As described above, the vehicle 921 passes through the intersection CR first, and thus no change in the passage schedules is made between before and after the adjustment.

FIG. 15B shows post-adjustment passage schedules for the vehicle 923 obtained after passage schedule adjustment is performed. As described above, the passage schedules for the vehicle 923 have been adjusted by using the adjustment period TB2 (tJ−tA), and each time point is delayed by (tJ−tA) from the time point before the adjustment. That is, the time points shown in FIG. 15B are respectively tA=tA+tJ−tA (=tJ), tD=tD+tJ−tA, tE**=tE+tJ−tA, tL*=tL+tJ−tA, tM*=tM+tJ−tA, tN*=tN+tJ−tA, and tP*=tIP+tJ−tA.

FIG. 15C shows a post-adjustment passage schedule for the vehicle 924 obtained after passage schedule adjustment is performed. As described above, the passage schedule for the vehicle 924 has been adjusted by using the adjustment period TB1 (tJ−tF), and each time point is delayed by (tJ−tF) from the time point before the adjustment.

It is noted that the possibility of the collision might not be eliminated by merely performing passage schedule adjustment one time. Therefore, it is also considered that: determination as to the possibility of the collision is performed again on the basis of the post-adjustment passage schedules; and passage schedule adjustment is repeated until it is determined that there is no possibility of a collision.

Next, another example of the case where a plurality of vehicles enter the intersection CR will be described with reference to FIG. 16. In the example shown in FIG. 16, the vehicle 921 that straightly advances in the intersection CR enters the intersection CR from the road R1, and a vehicle 925 that is a vehicle subsequent to the vehicle 921 straightly advances in the intersection CR. Further, a vehicle 922 that turns right in the intersection CR waits on the road R2. The vehicle 922 is assumed to have already waited for at least a predetermined period and to satisfy the condition of the priority level 2 shown in FIG. 13. The vehicle 922 is assumed to have already received a passage command and to be in a state of being able to start traveling immediately (it is assumed that no time lag resulting from the start of traveling is present). Further, the vehicle 923 that straightly advances in the intersection CR enters the intersection CR from the road R3. Further, the vehicle 924 that turns left in the intersection CR enters the intersection CR from the road R4. It is assumed that the vehicles 921, 922, 923, and 925 have not yet entered the unadjustable areas NR, but the vehicle 924 has already entered the unadjustable area NR.

Figure 16:
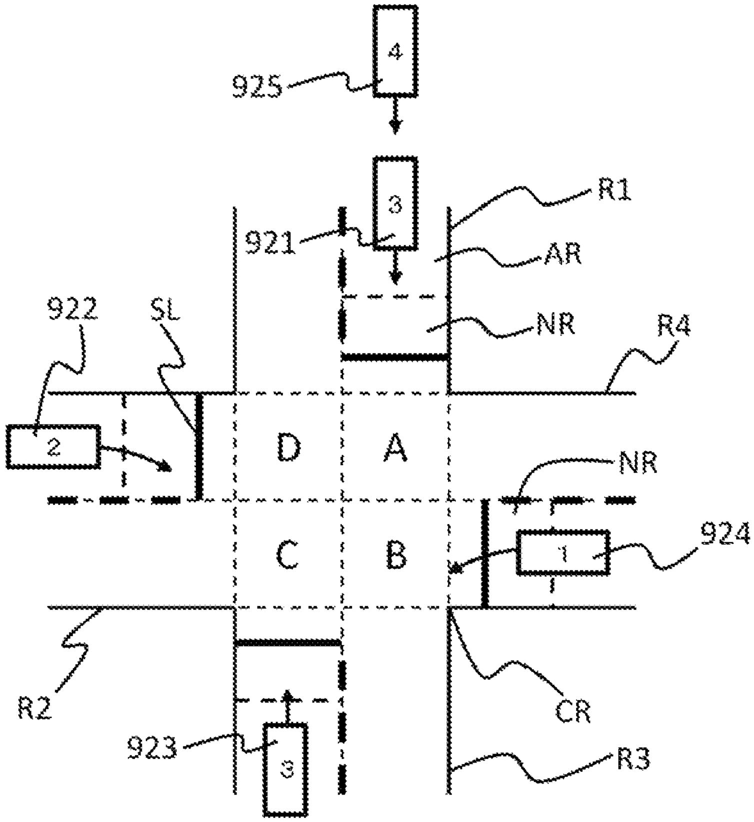
FIG. 16 is a diagram showing another example of passage ranks in the case where a plurality of vehicles enter the intersection.

In the case of the example shown in FIG. 16, the vehicle 924 satisfies the condition of the priority level 1 shown in FIG. 13. The vehicle 922 satisfies the condition of the priority level 2. The vehicle 921, the vehicle 923, and the vehicle 925 satisfy the condition of the priority level 4. The vehicle 924 satisfies the condition of the priority level 5. The vehicle 922 satisfies the condition of the priority level 6. Although the vehicle 922 satisfies the conditions of the priority level 2 and the priority level 6, a higher priority level is employed as described above, and thus the priority level of the vehicle 922 is set to 2. Likewise, although the vehicle 924 satisfies the conditions of the priority level 1 and the priority level 5, a higher priority level is employed, and thus the priority level of the vehicle 922 is set to 1. The vehicle 921, the vehicle 923, and the vehicle 925 each satisfy the condition of the priority level 4. The vehicle 921 and the vehicle 925 are traveling on the same road R1, and the vehicle 921 is closer to the intersection CR. Thus, the vehicle 921 is given a higher passage rank than the vehicle 925. Regarding the vehicle 921 and the vehicle 923, the vehicle 921 passes through only the area A and the area B, and meanwhile, the vehicle 923 passes through only the area C and the area D. Thus, there is no possibility of a collision therebetween. Therefore, the vehicle 921 and the vehicle 923 are given the same rank. Judging from the above situations, in the example in FIG. 16, higher passage ranks are given to, in the order of, the vehicle 924, the vehicle 922, the vehicle 921 and the vehicle 923 (same rank), and the vehicle 925.

Still another example of the case where a plurality of vehicles enter the intersection CR will be described with reference to FIG. 17. In the example shown in FIG. 17, the vehicle 921 that turns right in the intersection CR enters the intersection CR from the road R1, and the vehicle 925 that is a vehicle subsequent to the vehicle 921 straightly advances in the intersection CR. Further, the vehicle 922 that straightly advances in the intersection CR enters the intersection CR from the road R2. Further, the vehicle 923 that turns right in the intersection CR enters the intersection CR from the road R3. Further, the vehicle 924 that turns left in the intersection CR enters the intersection CR from the road R4. It is assumed that: at least a predetermined number of subsequent vehicles 920 are present behind the vehicle 923; and the vehicle 923 satisfies the condition of the priority level 3 shown in FIG. 13. None of the vehicles 921, 922, 923, 924, and 925 have entered the unadjustable areas NR.

Figure 17:
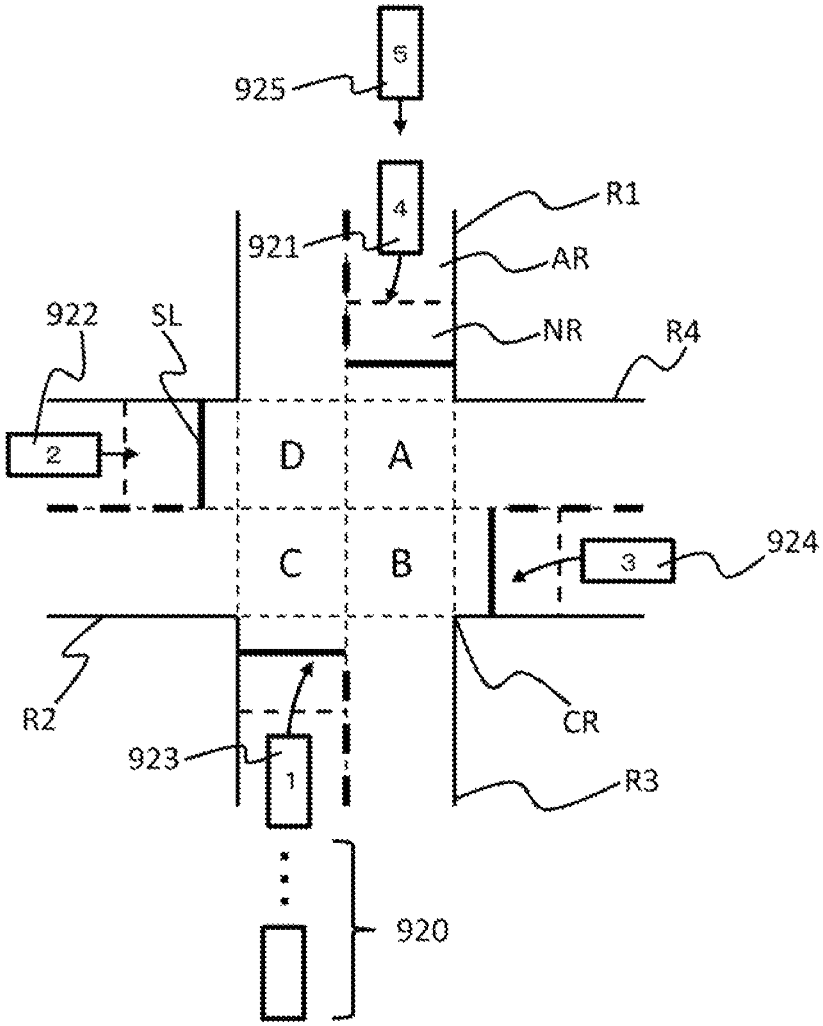
FIG. 17 is a diagram showing another example of the passage rank in the case where a plurality of vehicles enter the intersection.

In the case of the example shown in FIG. 17, there is no vehicle that satisfies the conditions of the priority levels 1 and 2 shown in FIG. 13. Meanwhile, the vehicle 923 satisfies the condition of the priority level 3 as described above. The vehicle 922 and the vehicle 925 satisfy the condition of the priority level 4. The vehicle 924 satisfies the condition of the priority level 5. The vehicle 921 and the vehicle 923 satisfy the condition of the priority level 6. Although the vehicle 923 satisfies the conditions of the priority level 3 and the priority level 6, a higher priority level is employed as described above, and thus the priority level of the vehicle 923 is set to 3. Although the priority level of the vehicle 925 is 4, the priority level of the vehicle 925 is set to be lower than the priority level 6 which is the priority level of the vehicle 921 since the vehicle 925 is subsequent to the vehicle 921 that is traveling on the same road R1 and that is closer to the intersection CR than the vehicle 925 is. Judging from the above situations, in the example in FIG. 17, higher passage ranks are given to, in the order of, the vehicle 923, the vehicle 922, the vehicle 924, the vehicle 921, and the vehicle 925.

It is noted that setting of the unadjustable areas NR is not essential. If no unadjustable area NR is set, the priority level 1 shown in FIG. 13 is not provided, and the priority level 2 and the priority levels lower than the priority level 2 are moved up by one.

Figure 18:
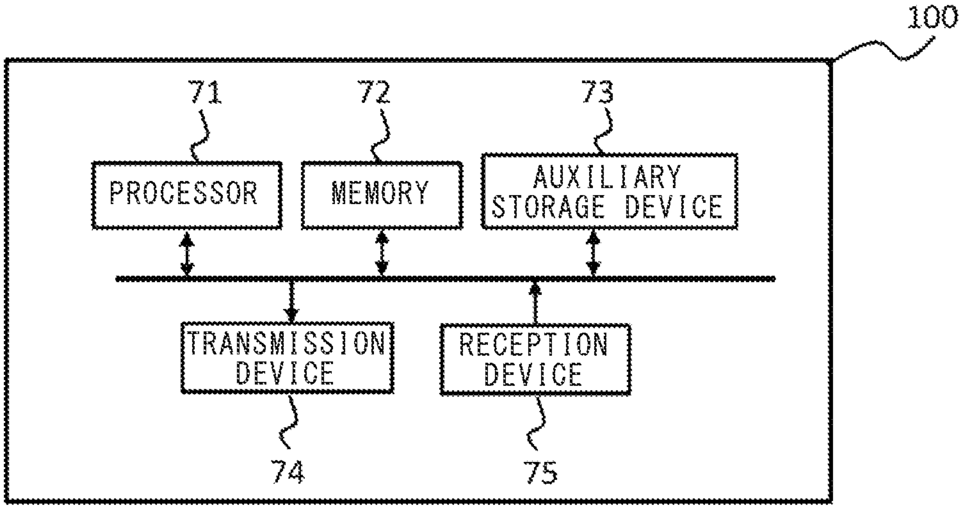
FIG. 18 is a diagram showing an example of a hardware configuration for implementing the traffic control device according to the first embodiment.

Next, a hardware configuration that implements the traffic control device according to the first embodiment will be described. FIG. 18 is a diagram showing an example of the hardware configuration that implements the traffic control device according to the first embodiment. The traffic control device 100 is composed mainly of a processor 71, a memory 72 as a main storage device, and an auxiliary storage device 73. The processor 71 is implemented by, for example, a central processing unit (CPU), an application specific integrated circuit (ASIC), a digital signal processor (DSP), a field programmable gate array (FPGA), or the like.

The memory 72 is implemented by a volatile storage device such as a random access memory, and the auxiliary storage device 73 is implemented by a nonvolatile storage device such as a flash memory, a hard disk, or the like. The auxiliary storage device 73 stores therein a predetermined program to be executed by the processor 71, and the processor 71 reads and executes the program as appropriate, to perform various computation processes. At this time, the above predetermined program is temporarily saved from the auxiliary storage device 73 into the memory 72, and the processor 71 reads the program from the memory 72. Various computation processes of a control system in the first embodiment are accomplished by execution of the predetermined program by the processor 71, as described above. The result of a computation process by the processor 71 is temporarily stored in the memory 72 and is, according to the purpose of the executed computation process, stored in the auxiliary storage device 73.

The traffic control device 100 further includes: a transmission device 74 which transmits data to external devices such as the traffic environment perceiving device 91 and a vehicle 92; and a reception device 75 which receives data from the external devices such as the traffic environment perceiving device 91 and the vehicle 92.

The communication unit 110 which transmits and receives various data is implemented by the transmission device 74 and the reception device 75. The adjustment unit 120 which performs various computation processes is implemented by the processor 71, the memory 72, and the auxiliary storage device 73. The storage unit 130 is implemented by the memory 72 or the auxiliary storage device 73.

Figure 19:
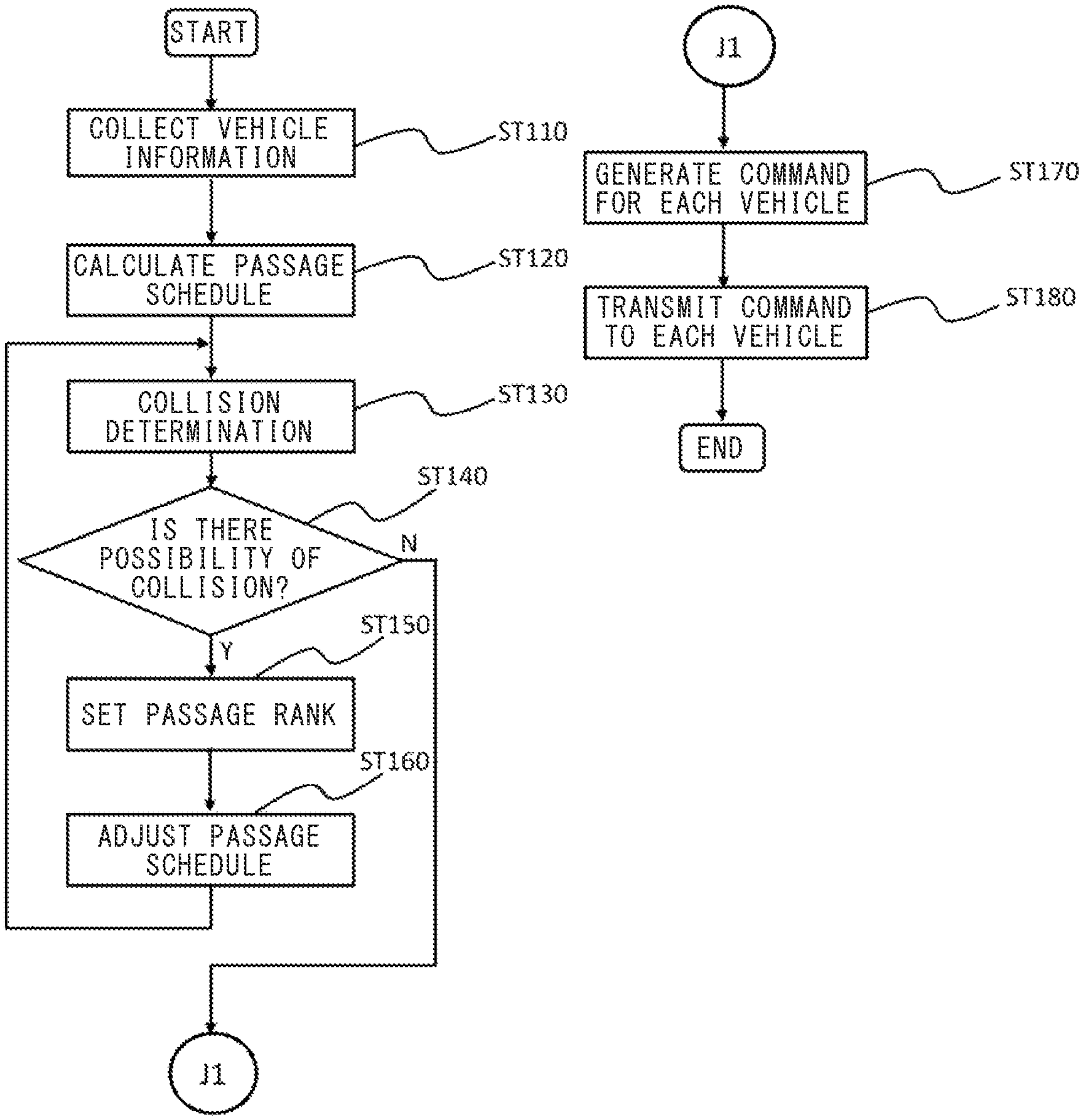
FIG. 19 is a flowchart of an operation of the traffic control device according to the first embodiment.

Next, operations will be described. FIG. 19 is a flowchart of an operation of the traffic control device according to the first embodiment. The traffic control device 100 repetitively executes the flow shown in FIG. 19 at a predetermined cycle (for example, 1 second). First, the traffic control device 100 collects information about a vehicle near an intersection (step ST110: vehicle information collecting step).

Figure 20:
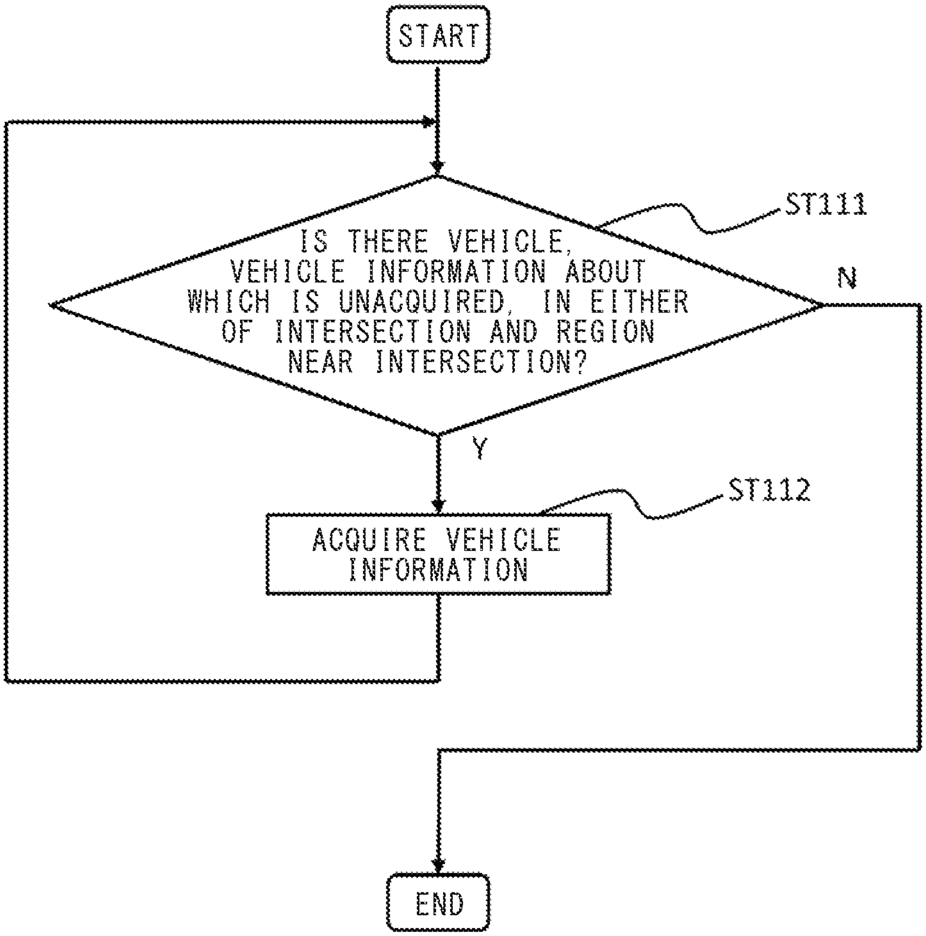
FIG. 20 is a flowchart of a vehicle information collecting step in the first embodiment.

FIG. 20 is a flowchart of the vehicle information collecting step in the first embodiment. In the vehicle information collecting step, vehicle information about a vehicle 92 that enters the intersection CR and vehicle information about a vehicle that is waiting in front of the intersection CR are sequentially acquired on the basis of the traffic situation in the intersection CR and in a region near the intersection CR. First, determination is performed as to whether or not there is a vehicle, vehicle information about which is unacquired, among the vehicles in the intersection CR and in the region near the intersection CR (step ST111). If there is a vehicle 92, vehicle information about which is unacquired, traffic situation information X and target passage direction information Y are received, as necessary, respectively from the traffic environment perceiving device 91 and the vehicle 92, whereby vehicle information is acquired (step ST112). If there is no vehicle 92, vehicle information about which is unacquired, i.e., if vehicle information about all the vehicles in the intersection CR and in the region near the intersection CR has been acquired, the vehicle information collecting step is ended. It is noted that the range within which vehicle information is collected is as follows. That is, pieces of vehicle information about vehicles traveling or waiting in the intersection CR and in a region that is near the intersection CR and that is within a predetermined range from the intersection CR, are collected. The specific range within which vehicle information is collected, is predetermined.

After the vehicle information collecting step, a passage schedule for each vehicle 92, the vehicle information about which has been acquired, is calculated (step ST120: passage schedule calculation step). Consequently, passage schedules in the present situation, i.e., pre-adjustment passage schedules, for the respective vehicles 92 are acquired.

After the passage schedule calculation step, determination is performed as to whether the vehicles 92 have no possibility of undergoing a collision when being caused to pass through the intersection CR according to the respectively calculated passage schedules (step ST130: collision determining step). The determination as to whether or not there is a possibility of a collision is performed as described above, and the determination as to a possibility of a collision is performed in each area on the basis of the collision determination criteria shown in FIG. 12. Processes vary as described below depending on whether or not there is a possibility of a collision (step ST140).

If determination that there is a possibility of a collision is performed in the collision determining step, passage ranks are set to avoid the collision (step ST150: passage rank setting step). As described above, passage ranks for the vehicles 92 that pass through the intersection CR are set in the passage rank setting step on the basis of the priority levels shown in FIG. 13.

Figure 21:
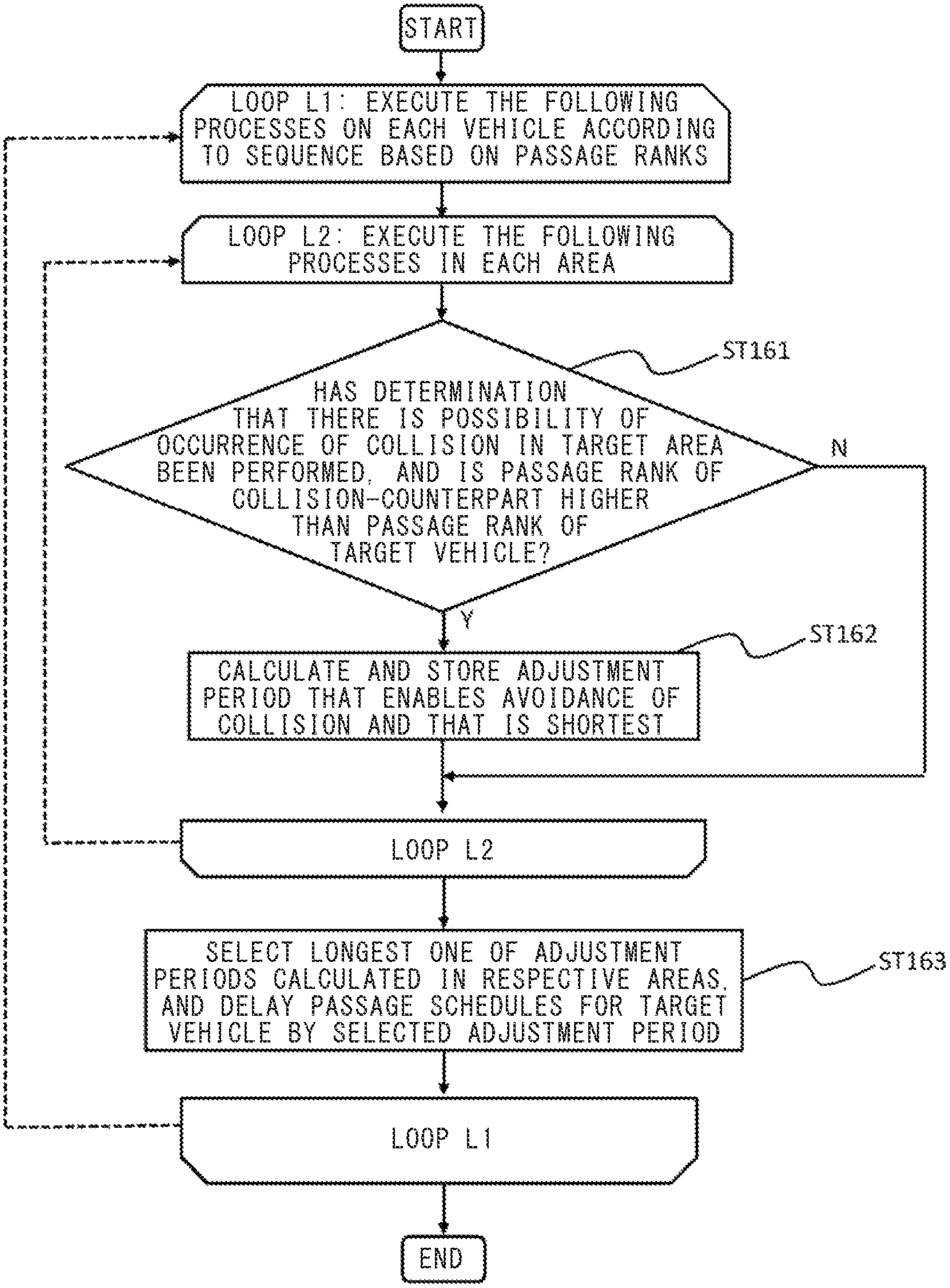
FIG. 21 is a flowchart of a passage schedule adjusting step in the first embodiment.

After the passage rank setting step, the passage schedule for each vehicle 92 is adjusted as necessary (step ST160: passage schedule adjusting step). FIG. 21 is a flowchart of the passage schedule adjusting step in the first embodiment. Passage schedule adjustment in the first embodiment is performed on each vehicle 92 according to a sequence based on the passage ranks (loop L1). Passage schedule adjustment for a certain vehicle 92 is performed in each area (loop L2), and then an overall passage schedule for the vehicle 92 is adjusted. In the loop L1 and the loop L2, a vehicle 92 to be subjected to passage schedule adjustment, is referred to as a "target vehicle", and an area for which an adjustment period is calculated through determination as to whether or not the passage schedule for the target vehicle is to be adjusted, is referred to as a "target area". A vehicle 92 determined to have a possibility of undergoing a collision with the target vehicle is referred to as a "collision-counterpart vehicle".

First, if a result of the collision determination indicates that the target vehicle has a possibility of undergoing a collision in the target area, and the passage rank of the collision-counterpart vehicle is higher than the passage rank of the target vehicle, it is determined that adjustment of the passage schedule for the target vehicle needs to performed in the target area (step ST161). Then, the procedure proceeds to step ST162. If the target vehicle has no possibility of undergoing a collision in the target area, or the passage rank of the collision-counterpart vehicle is lower than the passage rank of the target vehicle even in the case of the presence of the possibility of undergoing the collision, no action is taken. That is, no passage schedule adjustment is performed in the target area.

If the passage schedule for the target vehicle is adjusted in the target area, the passage schedule for the target vehicle is adjusted (delayed) so as to avoid the collision. As described above, the adjustment period is preferably short for smooth traffic. Thus, a period that enables avoidance of the collision and that is shortest, is stored as an adjustment period in the target area. When the adjustment period in the target area is stored, the procedure proceeds to adjustment of a passage schedule in a next area. In this manner, the processes (step ST161 and step ST162) in the loop L2 are performed in all the areas. It is noted that the adjustment period only has to be set to zero in an area in which passage schedule adjustment has been determined to be unnecessary.

After adjustment periods for the target vehicle are calculated (in the case of being necessary) in all the areas, the longest adjustment period among the adjustment periods in the respective areas is selected as an adjustment period for all the passage schedules for the target vehicle. Further, all the passage schedules, i.e., the passage schedules in all the areas, for the target vehicle are delayed by the adjustment period (step ST163). Thereafter, passage schedule adjustment is performed on the vehicles each having a lower passage rank than the target vehicle so that the processes (loop L2 and step ST163) in the loop L1 are performed on all the vehicles 92. The passage schedules for the vehicles 92 are adjusted according to the sequence based on the passage ranks, and thus, while adjustments of the passage schedules for vehicles having high passage ranks are successively reflected, the passage schedules for vehicles having lower passage ranks are adjusted.

After the passage schedule adjusting step, the collision determining step is performed again to check whether or not the possibility of the collision has been eliminated with the post-adjustment passage schedules. If it is determined that there is the possibility of the collision, the passage rank setting step and the passage schedule adjusting step are repeated. It is noted that the second and subsequent times of the passage rank setting step may be omitted. Meanwhile, if it is anticipated that the possibility of the collision is eliminated through one time of passage schedule adjustment, the procedure may proceed to a command generating step described later without performing the collision determination again.

Figure 22:
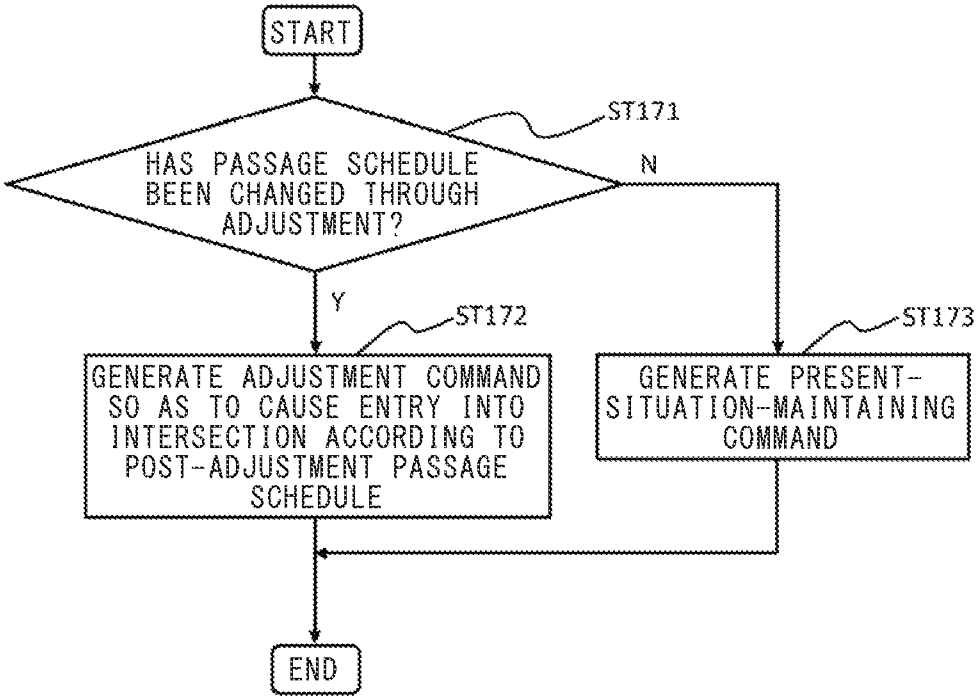
FIG. 22 is a flowchart of a command generating step in the first embodiment.

If determination that there is no possibility of a collision is performed in the collision determining step, a command Z for each vehicle 92 is generated (step ST170: command generating step). FIG. 22 is a flowchart of the command generating step in the first embodiment. FIG. 22 explains generation of a command for one vehicle 92 among the vehicles to which the commands Z are to be transmitted. In actuality, the processes in steps from step ST171 to step ST173 described later are performed on all the vehicles to which commands Z are to be transmitted, whereby a command Z is generated for each vehicle 92.

First, determination is performed as to whether or not the passage schedules have been changed through adjustment (step ST171). If the passage schedules have been changed through adjustment, an adjustment command is generated so as to cause entry into the intersection according to the post-adjustment passage schedules (step ST172). If the passage schedules have not been changed, a present-situation-maintaining command not to make adjustment regarding passage of the vehicle is generated.

The adjustment command is a command to cause the vehicle to pass through the intersection CR according to the post-adjustment passage schedules. The adjustment command encompasses a deceleration command, a waiting command, or the like. The deceleration command is an instruction of the degree of deceleration and the period for performing the deceleration. The waiting command is an instruction of a waiting period and causes the vehicle to start traveling after elapse of the waiting period. That is, the waiting command functions as a passage command after the elapse of the waiting period. A specific waiting period is determined on the basis of the traffic situation information X acquired by the traffic environment perceiving device 91.

After the command generating step, each command Z generated in the command generating step is transmitted to the corresponding vehicle 92 (step ST180).

In the above description, the intersection CR is assumed to be a crossroad at which a two-lane road and a two-lane road intersect, and setting of the areas in the intersection is performed on the basis of this assumption. However, the first embodiment is applicable to various intersections CR.

Figure 23:
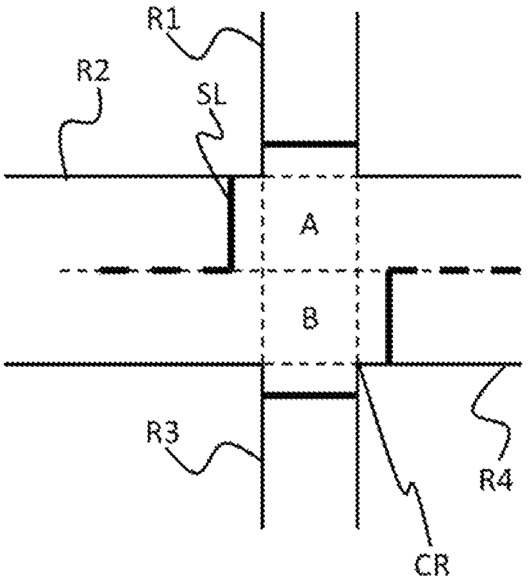
FIG. 23 is a diagram for explaining setting of areas in an intersection, and is a diagram for explaining the case where the intersection is a crossroad at which a two-lane road and a one-lane road intersect.

FIG. 23 is a diagram for explaining setting of areas in an intersection, and is a diagram for explaining the case where the intersection is a crossroad at which a two-lane road and a one-lane road intersect. To the intersection CR shown in FIG. 23, a one-lane road R1 and a one-lane road R3 are respectively connected on the upper side in the drawing and on the lower side in the drawing, and a two-lane road R2 and a two-lane road R4 are respectively connected on the left side in the drawing and on the right side in the drawing. In such a case, the intersection CR has a width corresponding to two lanes in the up-down direction in the drawing. Thus, the intersection CR is divided into two equal areas by division lines which are the center lines of the road R2 and the road R4. By this division, two areas A and B are set.

Figure 24:
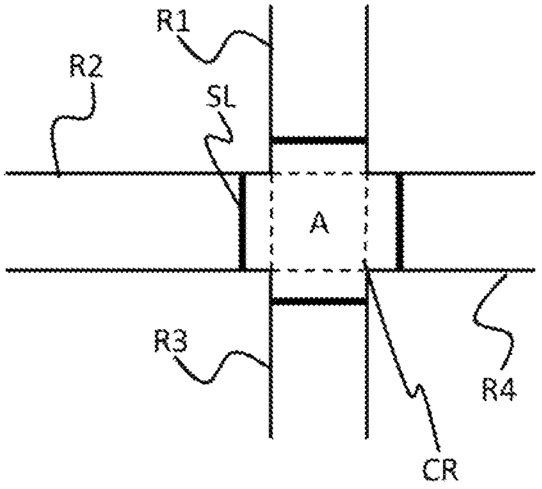
FIG. 24 is a diagram for explaining setting of areas in an intersection, and is a diagram for explaining the case where the intersection is a crossroad at which a one-lane road and a one-lane road intersect.

FIG. 24 is a diagram for explaining setting of areas in an intersection, and is a diagram for explaining the case where the intersection is a crossroad at which a one-lane road and a one-lane road intersect. To the intersection CR shown in FIG. 24, a one-lane road R1 and a one-lane road R3 are respectively connected on the upper side in the drawing and on the lower side in the drawing, and a one-lane road R2 and a one-lane road R4 are respectively connected on the left side in the drawing and on the right side in the drawing. In such a case, the intersection CR has a width corresponding to only one lane in each of the up-down direction in the drawing and the left-right direction in the drawing, and cannot be divided into a plurality of areas. Therefore, the entire intersection CR is set as an area A.

Figure 25:
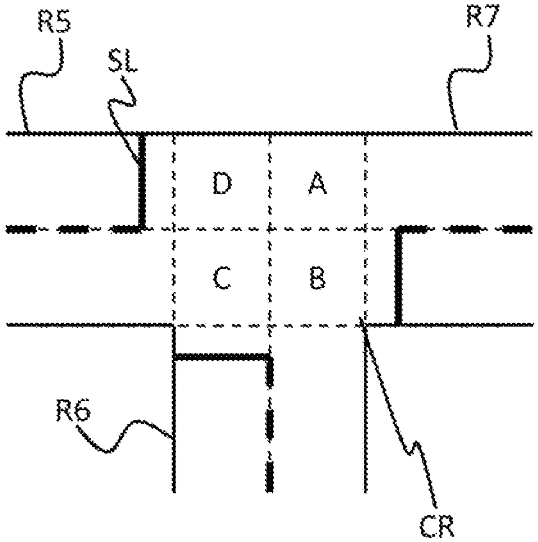
FIG. 25 is a diagram for explaining setting of areas in an intersection, and is a diagram for explaining the case where the intersection is a T junction at which a two-lane road and a two-lane road intersect.

FIG. 25 is a diagram for explaining setting of areas in an intersection, and is a diagram for explaining the case where the intersection is a T junction at which a two-lane road and a two-lane road intersect. To the intersection CR shown in FIG. 25, a two-lane road R5 and a two-lane road R7 are respectively connected on the left side in the drawing and on the right side in the drawing, and a two-lane road R6 is connected on the lower side in the drawing. In such a case, the intersection CR has a width corresponding to two lanes in each of the up-down direction in the drawing and the left-right direction in the drawing. Thus, the intersection CR is divided into four equal areas by division lines which are the center lines of the road R5 and the road R7 connected to the intersection CR and the center line of the road R6 connected to the intersection CR. By this division, four areas A, B, C, and D are set.

Figure 26:
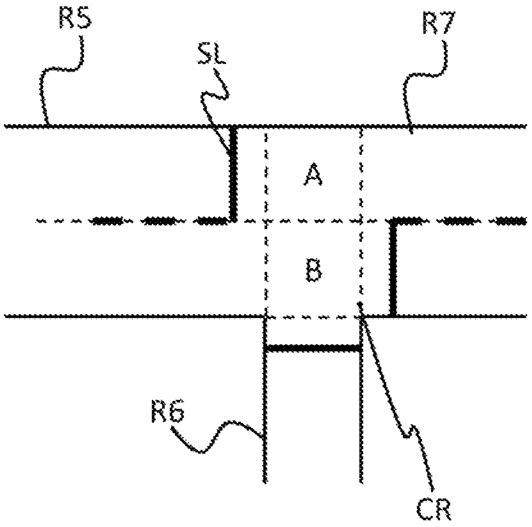
FIG. 26 is a diagram for explaining setting of areas in an intersection, and is a diagram for explaining the case where the intersection is a T junction at which a two-lane road and a one-lane road intersect.

FIG. 26 is a diagram for explaining setting of areas in an intersection, and is a diagram for explaining the case where the intersection is a T junction at which a two-lane road and a one-lane road intersect. To the intersection CR shown in FIG. 26, a two-lane road R5 and a two-lane road R7 are respectively connected on the left side in the drawing and on the right side in the drawing, and a one-lane road R6 is connected on the lower side in the drawing. In such a case, the intersection CR has a width corresponding to two lanes in the up-down direction in the drawing. Thus, the intersection CR is divided into two equal areas by division lines which are the center lines of the road R5 and the road R7. By this division, two areas A and B are set.

Figure 27:
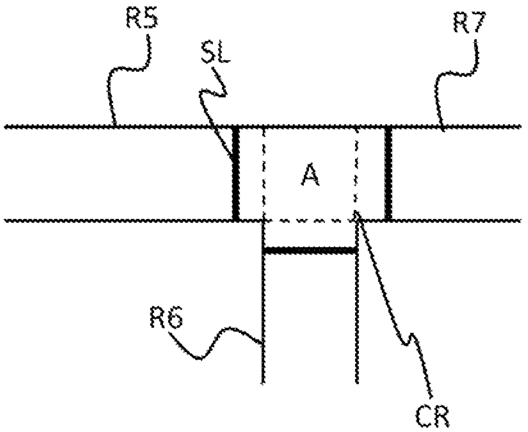
FIG. 27 is a diagram for explaining setting of areas in an intersection, and is a diagram for explaining the case where the intersection is a T junction at which a one-lane road and a one-lane road intersect.

FIG. 27 is a diagram for explaining setting of areas in an intersection, and is a diagram for explaining the case where the intersection is a T junction at which a one-lane road and a one-lane road intersect. To the intersection CR shown in FIG. 27, a one-lane road R5 and a one-lane road R7 are respectively connected on the left side in the drawing and on the right side in the drawing, and a one-lane road R6 is connected on the lower side in the drawing. In such a case, the intersection CR has a width corresponding to only one lane in each of the up-down direction in the drawing and the left-right direction in the drawing, and cannot be divided into a plurality of areas. Therefore, the entire intersection CR is set as an area A.

Figure 28:
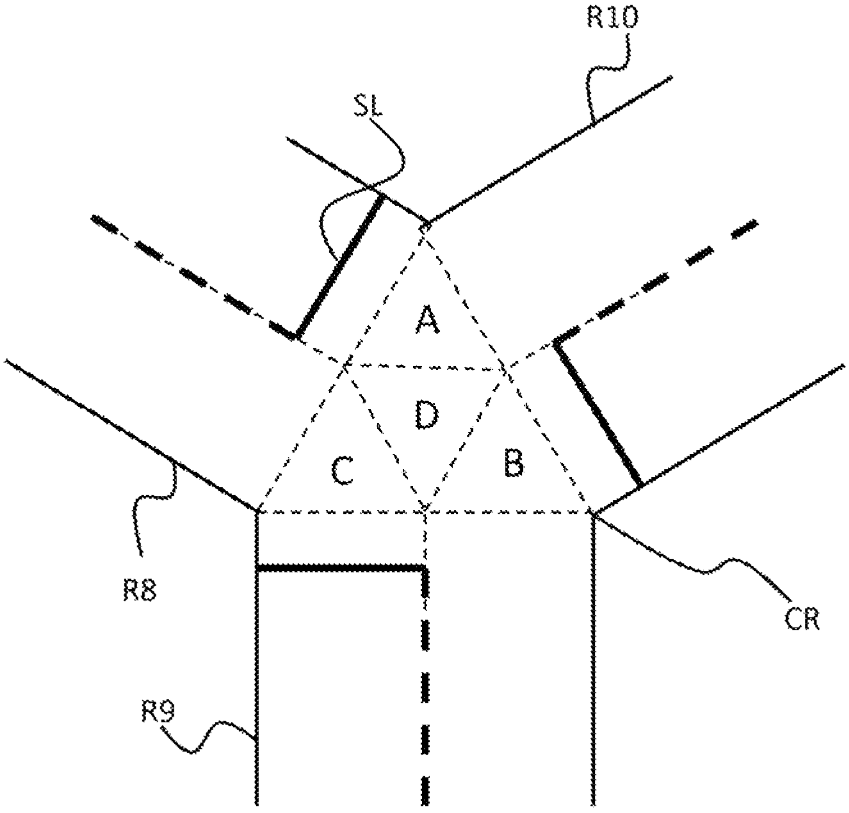
FIG. 28 is a diagram for explaining setting of areas in an intersection, and is a diagram for explaining the case where the intersection is a Y junction at which three two-lane roads intersect.

FIG. 28 is a diagram for explaining setting of areas in an intersection, and is a diagram for explaining the case where the intersection is a Y junction at which three two-lane roads intersect. To the intersection CR shown in FIG. 28, a two-lane road R8 and a two-lane road R10 are respectively connected on the upper left side in the drawing and the upper right side in the drawing, and a two-lane road R9 is connected on the lower side in the drawing. In such a case, the intersection CR forms a triangle delimited by three sides which are a side extending from the lower left to the upper right (the boundary between the road R8 and the intersection CR), a side extending from the upper left to the lower right (the boundary between the road R10 and the intersection CR), and a side extending in the left-right direction (the boundary between the road R9 and the intersection CR). Each side of the triangle has a width corresponding to two lanes. Therefore, the intersection CR is divided by division lines which are three connection lines connecting the midpoints of the respective sides, whereby the intersection CR is divided into four equal areas. By this division, four areas A, B, C, and D are set.

At any of the above intersections CR, passage schedules for each vehicle 92 that enters the intersection CR can be calculated, and, in each area, the timing at which the area is set as a passage-scheduled area or a passage-in-progress area can be calculated, whereby collision determination can be performed. In addition, passage ranks can also be set for a plurality of vehicles 92 that enter the intersection CR, whereby the above passage schedule adjustment can also be performed.

According to the first embodiment, smooth traffic in an intersection can be realized. More specifically, the first embodiment includes: a passage schedule calculation unit which calculates, on the basis of vehicle information about vehicles that enter an intersection, passage schedules according to which the vehicles pass through the intersection; a collision determination unit which determines, on the basis of the passage schedules, whether the vehicles have a possibility of a collision; a passage rank setting unit which sets passage ranks for the vehicles if the collision determination unit determines that there is the possibility of the collision; a command generation unit which generates a command for each vehicle; and a passage schedule adjustment unit which calculates an adjustment period on the basis of a result of comparing the passage schedules for the vehicles determined to have the possibility of the collision, and delays, by the adjustment period, a passage schedule for a vehicle that has a low passage rank among the vehicles determined to have the possibility of the collision, to adjust the passage schedule. The passage schedule adjustment unit calculates an adjustment period necessary for avoiding a collision and delays a passage schedule for a vehicle having a low passage rank. However, since the passage schedule adjustment unit delays the passage schedule by only an adjustment period necessary for avoiding the collision, a waiting period longer than necessary does not result. Thus, smooth traffic in the intersection can be realized.

Second Embodiment

Figure 29:
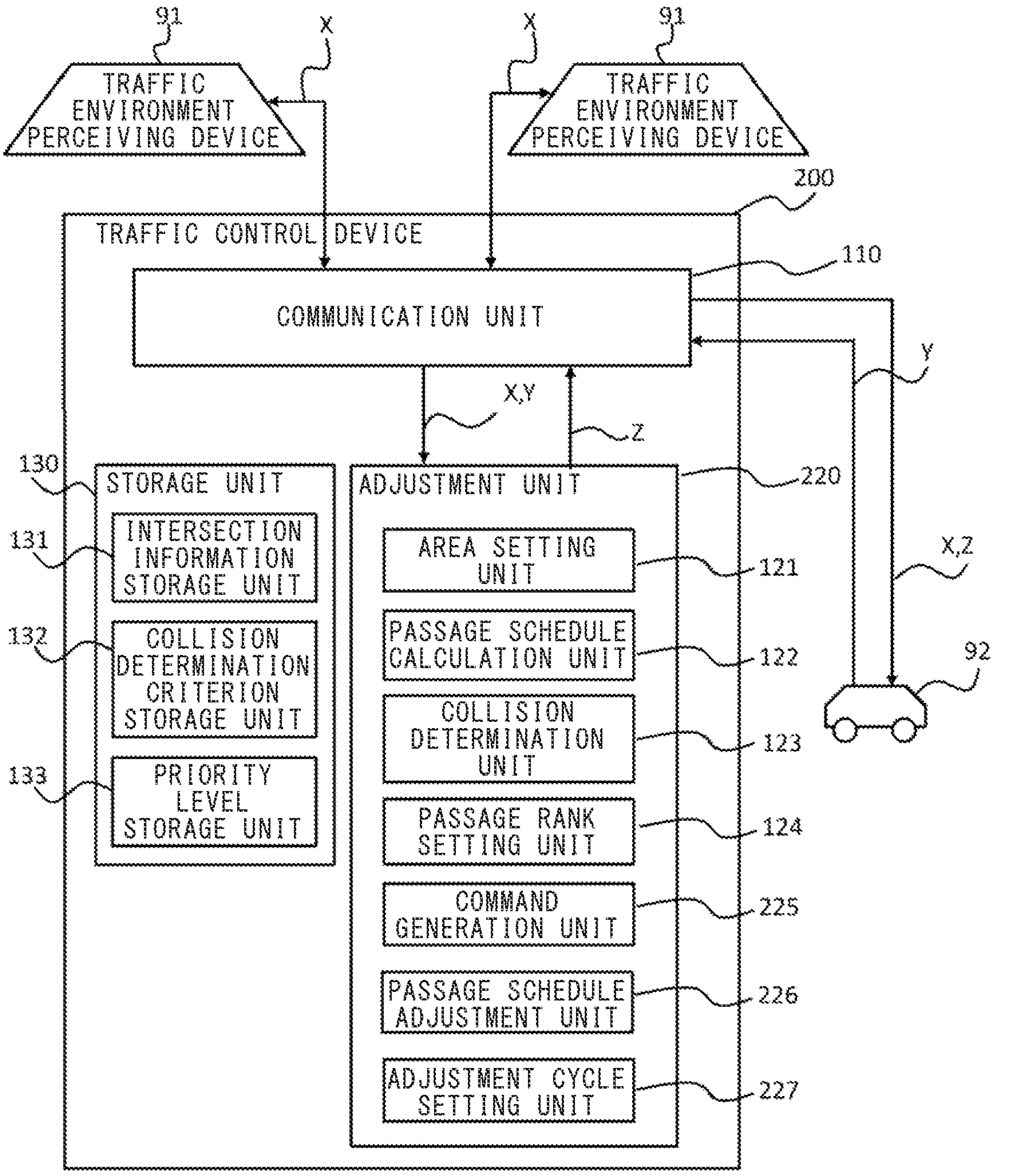
FIG. 29 is a block diagram showing a traffic control device according to a second embodiment.

Next, a second embodiment will be described with reference to FIG. 29 to FIG. 32. It is noted that parts identical or corresponding to those in FIG. 1 to FIG. 28 are denoted by the same reference characters, and description thereof will be omitted. FIG. 29 is a block diagram showing a traffic control device according to the second embodiment. An adjustment unit 220 of a traffic control device 200 includes an adjustment cycle setting unit 227 which sets an adjustment cycle T_n described later. Further, a command generation unit 225 and a passage schedule adjustment unit 226 differ from the command generation unit 125 and the passage schedule adjustment unit 126 in the first embodiment.

Figure 30:
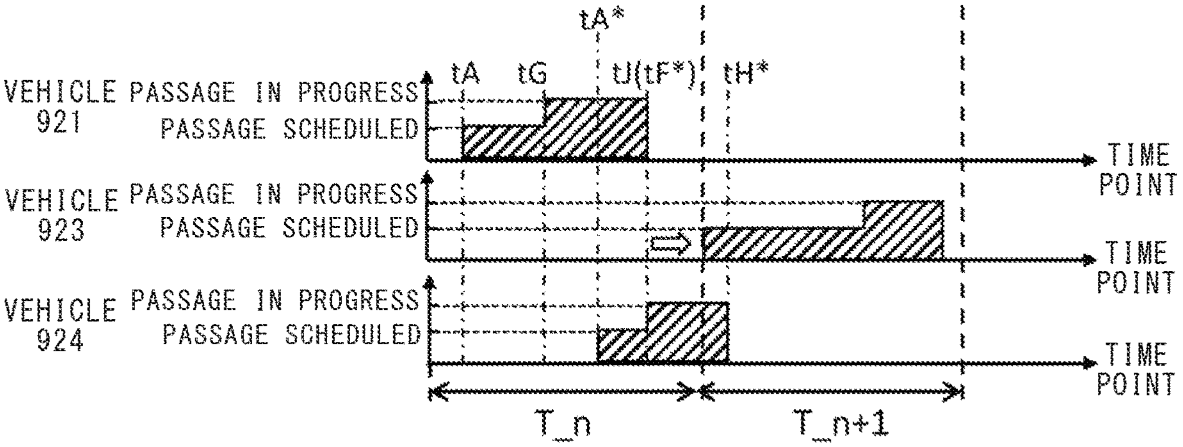
FIG. 30 is a diagram for explaining an adjustment cycle in the second embodiment.

FIG. 30 is a diagram for explaining an adjustment cycle in the second embodiment. For comparison with the first embodiment, FIG. 30 is based on the passage schedule shown in FIG. 14B. In the second embodiment, the adjustment cycle setting unit 227 predetermines an adjustment cycle T_n. If a passage completion time point of a certain vehicle 92 becomes later than an ending time point of the present adjustment cycle when passage schedule adjustment is performed in the order of the passage ranks, a vehicle having a lower passage rank than the above certain vehicle 92 is not subjected to passage schedule adjustment by the passage schedule adjustment unit 226. Meanwhile, determination to merely cause the vehicle having a lower passage rank than the above certain vehicle 92 to wait, is performed. Thus, the command generation unit 225 generates a waiting command as a command Z for the vehicle having a lower passage rank than the above certain vehicle 92.

The "passage completion time point" is a time point at which a vehicle 92 exits the intersection CR by passing through the intersection CR. If the vehicle 92 passes through only one area at the time of passing through the intersection CR, the exit time point from the area is the passage completion time point. Meanwhile, if the vehicle 92 passes through a plurality of areas, the latest time point among the exit time points from the respective areas is the passage completion time point. FIG. 30 shows passage schedules corresponding to the example shown in FIG. 10. Thus, as is known from FIG. 15A to FIG. 15C, the passage completion time point of each of the vehicle 921 and the vehicle 924 is the exit time point from area B, and the passage completion time point of the vehicle 923 is the exit time point from the area A. The sequence for the areas through which each vehicle passes is not changed between before and after passage schedule adjustment. Thus, the area, the exit time point from which is a passage completion time point, is also not changed between before and after passage schedule adjustment.

The vehicle given the waiting command passes through the intersection CR in the next round of the adjustment cycle. Description based on FIG. 30 will be given as follows. A time point tH* which is the time point at which the vehicle 924 exits the area B is later than the ending time point of the adjustment period T_n. In this case, the vehicle 923 having a lower passage rank than the vehicle 924 is not subjected to passage schedule adjustment but is merely given a waiting command. The waiting period in this case is a period up to the ending time point of the adjustment cycle T_n, i.e., the starting time point of the next round of the adjustment cycle T_n+1. In the case where no adjustment cycle is present as in the first embodiment, the time point at which the vehicle 923 enters the intersection CR is the time point tF*. Meanwhile, in the second embodiment, the time point at which the vehicle 923 enters the intersection CR is the starting time point of the adjustment cycle T_n+1.

In the case of using the adjustment cycle T_n, if there are many target vehicles 92 to be subjected to passage schedule adjustment so that a calculation amount for adjustment periods becomes enormous, a burden of a calculation process can be mitigated by terminating passage schedule adjustment in a fixed range. In particular, a broader target range for adjustment by the traffic control device 200 leads to a larger calculation amount for passage schedule adjustment, and thus the above advantageous effect of using the adjustment cycle T_n is significant. Further, also if adjustment of the passage schedules for vehicles having the second highest and third highest passage ranks influences passage schedules for vehicles having the fourth highest and lower passage ranks, the calculation amount becomes enormous, and thus the advantageous effect of using the adjustment cycle T_n is significant. It is noted that the adjustment cycle T_n is not particularly limited, but is contemplated to be, for example, 30 seconds or 1 minute.

Figure 31:
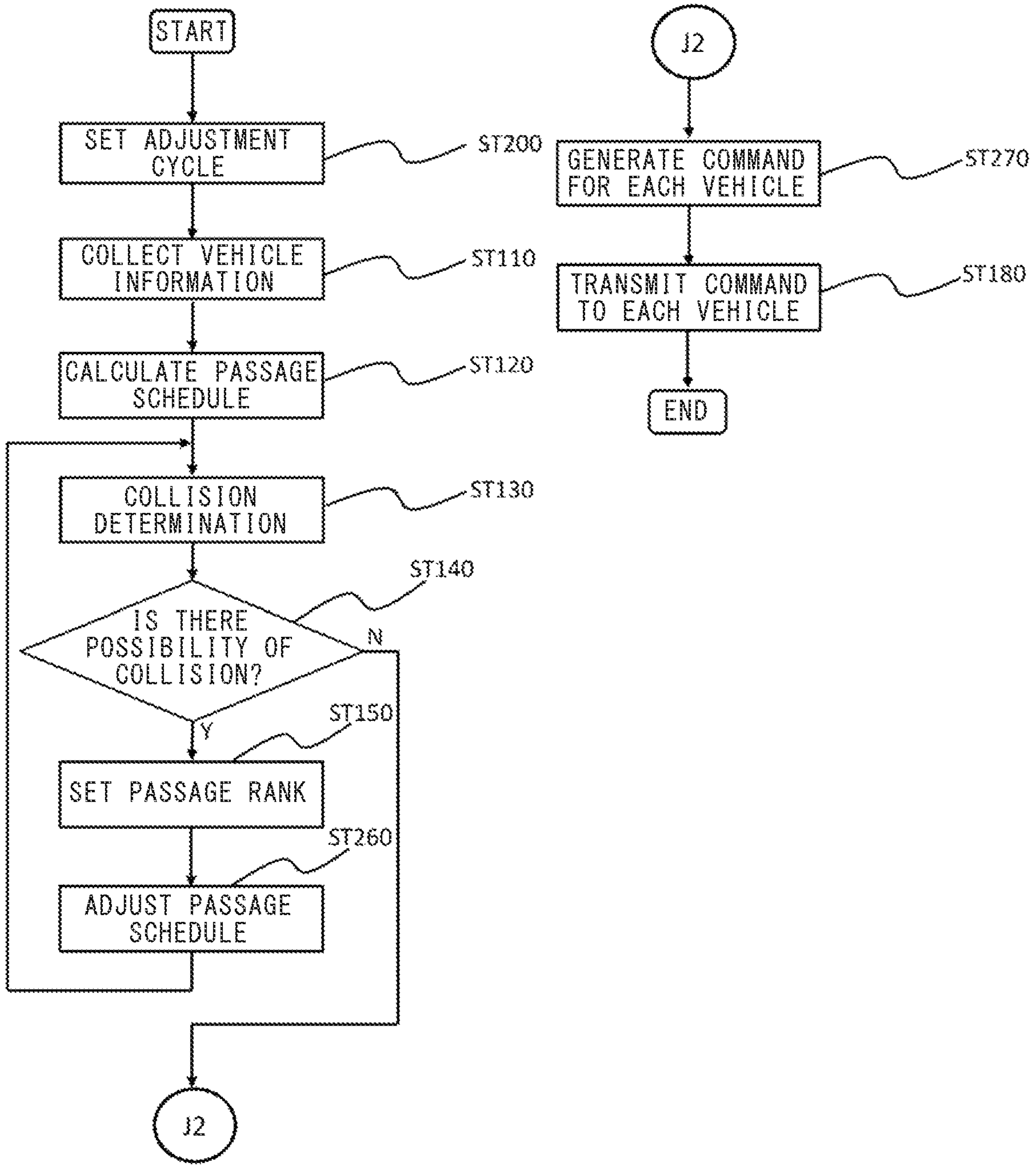
FIG. 31 is a flowchart of an operation of the traffic control device according to the second embodiment.

Next, operations will be described. FIG. 31 is a flowchart of an operation of the traffic control device according to the second embodiment. First, the traffic control device 200 sets an adjustment cycle T_n (step ST200: adjustment cycle setting step). Cycles (T_n+1, T_n+2 . . . ) subsequent to T_n are also simultaneously set.

Next, in the same manner as in the first embodiment, the vehicle information collecting step (step ST110), the passage schedule calculation step (step ST120), and the collision determining step (step ST130) are performed in this order. If determination that there is a possibility of a collision is performed in the collision determining step (step ST140), the passage rank setting step (step ST150) is performed.

Figure 32:
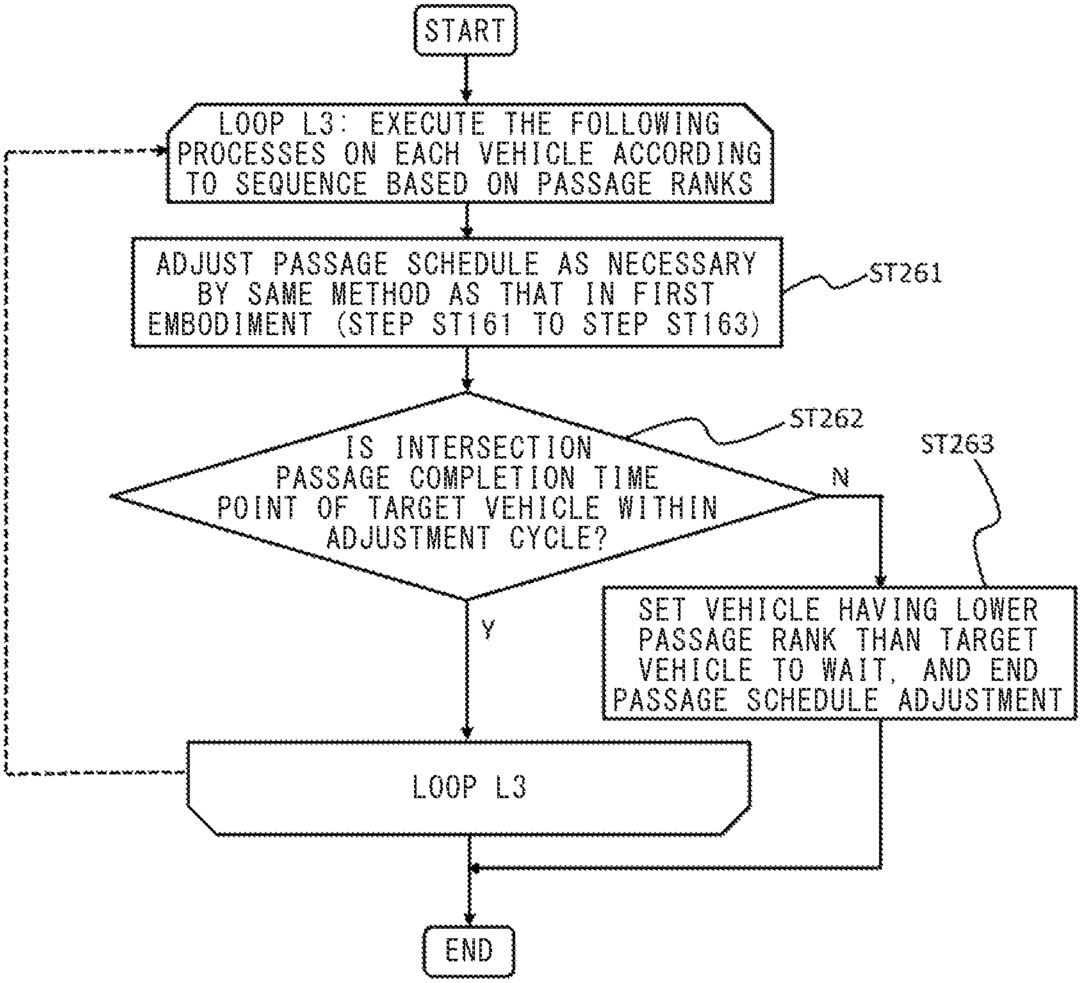
FIG. 32 is a flowchart of a passage schedule adjusting step in the second embodiment.

After the passage rank setting step, the passage schedule for each vehicle 92 is adjusted as necessary (step ST260: passage schedule adjusting step). FIG. 32 is a flowchart of the passage schedule adjusting step in the second embodiment. Passage schedule adjustment in the second embodiment is the same as that in the first embodiment in that the passage schedule adjustment is performed on each vehicle 92 according to the sequence based on the passage ranks (loop L3). First, by the same method as that in the first embodiment (step ST161 to step ST163 shown in FIG. 21), adjustment of a passage schedule for a target vehicle is performed (step ST261).

Next, determination is performed as to whether or not the passage completion time point for the intersection CR is within the adjustment cycle T_n in a post-adjustment passage schedule for the target vehicle (step ST262). If the passage completion time point is within the adjustment cycle T_n, adjustment of the passage schedule for the target vehicle is ended, and the procedure proceeds to adjustment of a passage schedule for a next vehicle.

Meanwhile, if the passage completion time point is not within the adjustment cycle T_n, i.e., the passage completion time point is later than the ending time point of the adjustment cycle T_n, a vehicle having a lower passage rank than the target vehicle is set to "wait", and the passage schedule adjusting step is ended (step ST263). In this case, the vehicle having a lower passage rank than the target vehicle is not subjected to passage schedule adjustment.

After the passage schedule adjusting step, the collision determining step is performed again in the same manner as in the first embodiment, to check whether or not the possibility of the collision has been eliminated with post-adjustment passage schedules. If it is determined that there is the possibility of the collision, the passage rank setting step and the passage schedule adjusting step are repeated.

If determination that there is no possibility of a collision is performed in the collision determining step, a command Z for each vehicle 92 is generated (step ST270: command generating step). The command generating step in the second embodiment is the same as the command generating step in the first embodiment shown in FIG. 22, except that, for the vehicle 92 having been set to "wait" in the passage schedule adjusting step, a "waiting command" to cause the vehicle 92 to wait until the starting time point of the next round of the adjustment cycle T_n+1 (the same as the ending time point of the adjustment cycle T_n) is generated.

After the command generating step, each command Z generated in the command generating step is transmitted to the corresponding vehicle (step ST180) in the same manner as in the first embodiment.

In the second embodiment, the same advantageous effects as those in the first embodiment can be obtained.

In addition, an adjustment cycle is predetermined, and, if there is a vehicle that completes passage through the intersection after the ending time point of the adjustment cycle, a vehicle having a lower passage rank than the said vehicle is not subjected to passage schedule adjustment and is given a waiting command to wait until start of the next round of the adjustment cycle. Therefore, increase in a calculation amount associated with passage schedule adjustment can be suppressed in the cases where there is a possibility that the calculation amount becomes enormous. The cases include: the case where there are many adjustment-target vehicles; the case where adjustment of passage schedules for vehicles having high passage ranks cumulatively influences passage schedules for vehicles having low passage ranks; and the like.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

91 traffic environment perceiving device
92, 920, 921, 922, 923, 924, 925 vehicle
100, 200 traffic control device
110 communication unit
120, 220 adjustment unit
121 area setting unit
122 passage schedule calculation unit
123 collision determination unit
124 passage rank setting unit
125, 225 command generation unit
126, 226 passage schedule adjustment unit
130 storage unit
131 intersection information storage unit
132 collision determination criterion storage unit
133 priority level storage unit
227 adjustment cycle setting unit
AR adjustable area
CR intersection
NR unadjustable area
X traffic situation information
Y target passage direction information
Z command

What is claimed is:

1. A traffic control device comprising:

a processor for executing a program; and a memory or a hard disk for storing the program, wherein the following operation is performed by the program executed by the processor, setting one or a plurality of areas in an intersection;

collecting, regarding each of a plurality of vehicles that enter the intersection, vehicle information including a location of the vehicle, a vehicle speed of the vehicle, and a passage direction of the vehicle in the intersection;

calculating passage schedules on the basis of the vehicle information, each passage schedule indicating a time period during which the area is kept as a passage-scheduled area for the vehicle when the vehicle passes through the intersection, and a time period during which the area is kept as a passage-in-progress area for the vehicle when the vehicle passes through the intersection;

determining whether or not the vehicles have a possibility of a collision on the basis of the passage schedules;

setting, on the basis of predetermined priority levels, passage ranks for the vehicles determined to have the possibility of undergoing the collision;

generating a command for each vehicle;

transmitting the command to the vehicle;

calculating an adjustment period on the basis of a result of comparing the passage schedules for the vehicles determined to have the possibility of the collision; and delaying, by the adjustment period, a passage schedule for a vehicle that has a low passage rank among the vehicles determined to have the possibility of the collision, to adjust the passage schedule.

2. The traffic control device according to claim 1, wherein adjusting the passage schedules for the vehicles is performed according to a sequence based on the passage ranks.

3. The traffic control device according to claim 2, wherein an adjustment cycle is preset, wherein if, as a result of performing passage schedule adjustment on a certain vehicle that is a target of the passage schedule adjustment among the vehicles, a time point at which the certain vehicle completes passage through the intersection is later than an ending time point of a present round of the adjustment cycle, adjusting the passage schedule for a vehicle having a lower passage rank than the certain vehicle is not performed, and a waiting command to cause the vehicle having a lower passage rank than the certain vehicle to wait until start of a next round of the adjustment cycle, is transmitted.

4. The traffic control device according to claim 1, wherein an area that extends for a predetermined distance from the intersection is defined as an unadjustable area, and a vehicle that has entered the unadjustable area among the vehicles is given a highest priority level among the priority levels.

5. The traffic control device according to claim 2, wherein an area that extends for a predetermined distance from the intersection is defined as an unadjustable area, and a vehicle that has entered the unadjustable area among the vehicles is given a highest priority level among the priority levels.

6. The traffic control device according to claim 3, wherein an area that extends for a predetermined distance from the intersection is defined as an unadjustable area, and a vehicle that has entered the unadjustable area among the vehicles is given a highest priority level among the priority levels.

7. The traffic control device according to claim 1, wherein if the passage schedules are adjusted, whether or not the vehicles have a possibility of a collision is determined on the basis of passage schedules obtained after the adjustment.

8. The traffic control device according to claim 2, wherein if the passage schedules are adjusted, whether or not the vehicles have a possibility of a collision is determined on the basis of passage schedules obtained after the adjustment.

9. The traffic control device according to claim 3, wherein if the passage schedules are adjusted, whether or not the vehicles have a possibility of a collision is determined on the basis of passage schedules obtained after the adjustment.

10. The traffic control device according to claim 1, wherein in a case where a time period during which a specific one of the areas is kept as the passage-in-progress area for a first vehicle among the plurality of vehicles, and a time period during which the specific area is kept as the passage-in-progress area for a second vehicle that differs from the first vehicle among the plurality of vehicles, overlap with each other, or in a case where a time period during which the specific area is kept as the passage-scheduled area for the first vehicle, and a time period during which the specific area is kept as the passage-scheduled area for the second vehicle, overlap with each other, the first vehicle and the second vehicle are determined to have a possibility of a collision.

11. The traffic control device according to claim 2, wherein in a case where a time period during which a specific one of the areas is kept as the passage-in-progress area for a first vehicle among the plurality of vehicles, and a time period during which the specific area is kept as the passage-in-progress area for a second vehicle that differs from the first vehicle among the plurality of vehicles, overlap with each other, or in a case where a time period during which the specific area is kept as the passage-scheduled area for the first vehicle, and a time period during which the specific area is kept as the passage-scheduled area for the second vehicle, overlap with each other, the first vehicle and the second vehicle are determined to have a possibility of a collision.

12. The traffic control device according to claim 3, wherein in a case where a time period during which a specific one of the areas is kept as the passage-in-progress area for a first vehicle among the plurality of vehicles, and a time period during which the specific area is kept as the passage-in-progress area for a second vehicle that differs from the first vehicle among the plurality of vehicles, overlap with each other, or in a case where a time period during which the specific area is kept as the passage-scheduled area for the first vehicle, and a time period during which the specific area is kept as the passage-scheduled area for the second vehicle, overlap with each other, the first vehicle and the second vehicle are determined to have a possibility of a collision.

13. The traffic control device according to claim 1, wherein each area has a width that allows at least one of the vehicles to pass through the area.

14. The traffic control device according to claim 2, wherein each area has a width that allows at least one of the vehicles to pass through the area.

15. The traffic control device according to claim 3, wherein each area has a width that allows at least one of the vehicles to pass through the area.

16. The traffic control device according to claim 1, wherein the vehicle information is collected via a traffic environment perceiving device provided outside of the traffic control device.

17. The traffic control device according to claim 2, wherein the vehicle information is collected via a traffic environment perceiving device provided outside of the traffic control device.

18. The traffic control device according to claim 3, wherein the vehicle information is collected via a traffic environment perceiving device provided outside of the traffic control device.

* * * * *